(12) United States Patent
Nagai et al.

(10) Patent No.: US 12,572,184 B2
(45) Date of Patent: Mar. 10, 2026

(54) DAMPING MECHANISM, HINGE APPARATUS, AND FOLDABLE ELECTRONIC DEVICE

(71) Applicant: Huawei Technologies Co., Ltd., Shenzhen (CN)

(72) Inventors: Kenji Nagai, Yokohama (JP); Akio Ishiguro, Yokohama (JP); Hui Lin, Yokohama (JP)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/925,617

(22) Filed: Oct. 24, 2024

(65) Prior Publication Data

US 2025/0053203 A1 Feb. 13, 2025

Related U.S. Application Data

(63) Continuation of application No. PCT/CN2023/090519, filed on Apr. 25, 2023.

(30) Foreign Application Priority Data

May 13, 2022 (CN) .......................... 202221152690.9

(51) Int. Cl.
*G06F 1/16* (2006.01)
*H04M 1/02* (2006.01)
*E05D 11/08* (2006.01)
(52) U.S. Cl.
CPC .......... *G06F 1/1681* (2013.01); *H04M 1/022* (2013.01); *E05D 11/081* (2013.01)

(58) Field of Classification Search
CPC ...... G06F 1/1681; H04M 1/022; E05D 11/04; E05D 11/081; E05D 11/082; E05D 11/087; E05D 2011/085; E05D 2011/1035
See application file for complete search history.

(56) References Cited

U.S. PATENT DOCUMENTS

| | | | | |
|---|---|---|---|---|
| 1,667,806 A | * | 5/1928 | Jacobs | ................... E05D 11/082 16/334 |
| 9,201,465 B2 | * | 12/2015 | Meyers | ................. G06F 1/1681 |
| 9,206,633 B1 | * | 12/2015 | Ju | ......................... G06F 1/1681 |

(Continued)

FOREIGN PATENT DOCUMENTS

| | | |
|---|---|---|
| CN | 217761887 U | 11/2022 |
| JP | 2004332789 A | 11/2004 |

(Continued)

*Primary Examiner* — Jeffrey O'Brien
(74) *Attorney, Agent, or Firm* — Conley Rose, P.C.

(57) ABSTRACT

A damping mechanism includes a fixed base, a damping swing arm, a rolling body, and a push-pressing apparatus. The damping swing arm is rotatably disposed on the fixed base by using a damping member. A first concave portion, a protrusion, and a second concave portion are disposed on a side wall of the damping member, and the protrusion has a guide surface inclined relative to an axis such that when the push-pressing apparatus squeezes the guide surface of the protrusion to the rolling body, the guide surface enhances a push-pressing force of the push-pressing apparatus, so that the damping member is subject to greater pressure, and torque damping is increased as the damping swing arm rotates.

20 Claims, 16 Drawing Sheets

(56) References Cited

U.S. PATENT DOCUMENTS

|  |  |  |  |  |
|---|---|---|---|---|
| 9,464,470 | B2 * | 10/2016 | Hu | ........................ H05K 5/0226 |
| 11,846,997 | B2 * | 12/2023 | Liao | .................... H04M 1/0216 |
| 2020/0218315 | A1 | 7/2020 | Huang et al. | |
| 2025/0013269 | A1 * | 1/2025 | Ding | .................. H04M 1/0268 |

FOREIGN PATENT DOCUMENTS

| | | | |
|---|---|---|---|
| JP | 2005337477 | A | 12/2005 |
| JP | 2007064427 | A | 3/2007 |

* cited by examiner

1

1

28
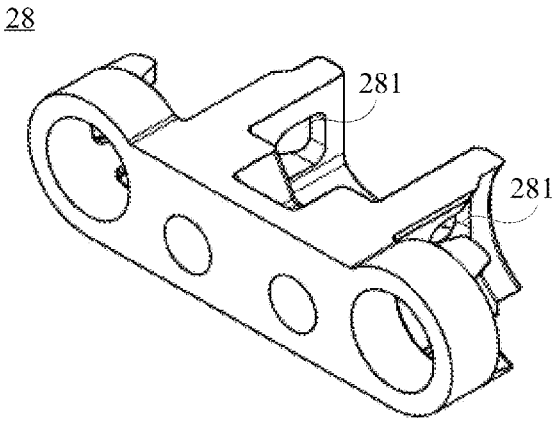
281
281
FIG. 11
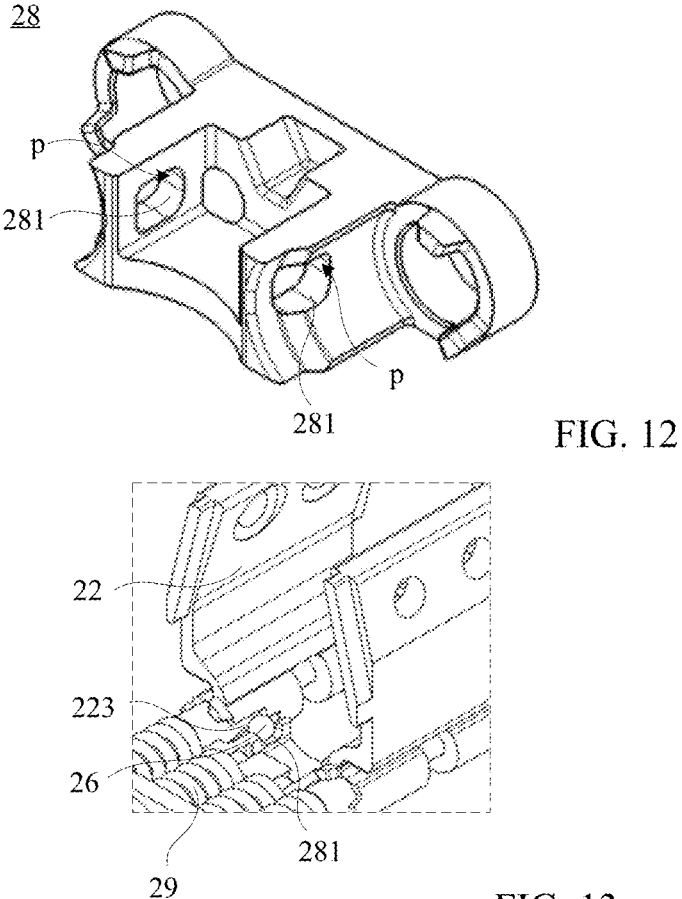
28
p
281
281
p
281
FIG. 12
22
223
26
29
281
FIG. 13

DAMPING MECHANISM, HINGE APPARATUS, AND FOLDABLE ELECTRONIC DEVICE

CROSS-REFERENCE TO RELATED APPLICATIONS

This is a continuation of International Patent Application No. PCT/CN2023/090519, filed on Apr. 25, 2023, which claims priority to Chinese Patent Application No. 202221152690.9, filed on May 13, 2022. The disclosures of the aforementioned applications are hereby incorporated by reference in their entireties.

TECHNICAL FIELD

This disclosure relates to the field of foldable electronic devices, and in particular, to a damping mechanism, a hinge apparatus, and a foldable electronic device.

BACKGROUND

With development of flexible screens, foldable electronic devices become an important direction of development of electronic devices. An existing foldable electronic device usually includes a first body, a second body, and a hinge mechanism that rotatably connects the first body and the second body, so that the first body and the second body can be folded or unfolded relative to each other. A hinge apparatus of the foldable electronic device is an important component for folding of the electronic device. Usually, the hinge apparatus has a damping mechanism, so that the foldable electronic device is subject to damping forces provided by the damping mechanism in the hinge apparatus in a process of being relatively folded and relatively unfolded, including when the foldable electronic device is relatively folded to a folding position, and when the foldable electronic device is relatively unfolded to an unfolding position. In this way, the first body and the second body of the foldable electronic device can hover at any angle, and operation comfortableness of relatively folding or relatively unfolding is improved. Alternatively, the foldable electronic device is stably kept at the folding position or the unfolding position.

However, space for the foldable electronic device to accommodate the hinge apparatus is limited, and the damping mechanism of the foldable electronic device is limited by space, resulting in difficulty in providing a sufficient damping force. Consequently, when the first body and the second body rotate relative to each other, it is difficult to stably hover at any rotation position. In addition, when a user rotates the first body and the second body, it is difficult to obtain sufficient damping feedback, and user comfortableness of using the foldable electronic device deteriorates.

SUMMARY

An objective of this disclosure is to resolve a problem that it is difficult for a damping mechanism to provide a sufficient damping force in limited space. Therefore, this disclosure provides a damping mechanism, including a fixed base, a damping swing arm, where at least one damping member is disposed at one end of the damping swing arm, and any one of the at least one damping member is rotatably connected to the fixed base, so that the damping swing arm rotates forward or reversely around an axis relative to the fixed base for switching of the damping swing arm between a folding position and an unfolding position; and the damping member has a first concave portion, a protrusion, and a second concave portion that are sequentially connected in a circumferential direction of the damping member, and the protrusion has a guide surface inclined relative to the axis, and a rolling body and a push-pressing apparatus, where the push-pressing apparatus abuts against the rolling body, and the rolling body abuts against the first concave portion, the protrusion, or the second concave portion of the damping member, so that the push-pressing apparatus applies an abut-pressing force to the damping member by using the rolling body, where when the damping swing arm is at the folding position, the rolling body abuts in the first concave portion, when the damping swing arm is at the unfolding position, the rolling body abuts in the second concave portion or when the damping swing arm rotates from the folding position or the unfolding position to a position between the folding position and the unfolding position, the rolling body rolls into the guide surface of the protrusion from the first concave portion or the second concave portion and abuts against the guide surface, and the push-pressing apparatus moves accordingly with the rolling body, so that the push-pressing apparatus is squeezed in a direction that is along the axis and that is away from the damping member.

By using the foregoing technical solutions, when the damping swing arm rotates from the folding position or the unfolding position to the position between the folding position and the unfolding position, the push-pressing apparatus applies a push-pressing force to the guide surface of the damping member by using the rolling body, and the guide surface is inclined relative to the axis. In this way, the push-pressing force of the push-pressing apparatus can be amplified, so that an action force of the rolling body on the guide surface is greater than the push-pressing force provided by the push-pressing apparatus. This generates a greater damping force in a rotation process of the damping swing arm. Therefore, the damping swing arm can more stably hover at any position in the rotation process, damping feedback obtained when a user rotates the damping swing arm is improved, and comfortableness obtained when the user rotates the damping swing arm is enhanced.

In addition, the rolling body and the damping member are connected in a rolling manner, and rolling friction is generated. Compared with a sliding friction connection manner, a friction force between the rolling body and the damping member is greatly reduced. This greatly reduces abrasion between the rolling body and the damping member, and improves durability of the damping mechanism.

In addition, the push-pressing apparatus, the rolling body, and the damping member of the damping swing arm are sequentially abutted. This has advantages of simple structure and compact arrangement, thereby reducing an overall volume of the damping mechanism and reducing space occupied by the damping mechanism. In addition, transmission is directly performed between the push-pressing apparatus, the rolling body, and the damping member of the damping swing arm. This effectively avoids a loss of the push-pressing force of the push-pressing apparatus in a transmission process, and has an advantage of high transmission efficiency.

In some embodiments, the push-pressing apparatus includes the following.

A sliding member is included, where the sliding member is slidably connected to the fixed base and is located at one end of the damping member, so that the sliding member slides relative to the fixed base in a direction that is along the axis and that is close to or away from the damping member, a contact portion is disposed on the sliding member, the contact portion has a push surface, and the rolling body abuts against the push surface of the contact portion in a rolling manner.

A push-pressing member is included, where the push-pressing member is disposed on a side that is of the sliding member and that faces away from the end of the damping member, and applies a push-pressing force to the sliding member. In this way, the push-pressing member pushes the sliding member to abut against the rolling body along the axis, to apply an action force in a constant direction to the rolling body. In addition, the push-pressing force of the push-pressing member can be directly transferred to the rolling body by using the sliding member, and directly acts on the damping member by using the rolling body. This reduces the loss of the push-pressing force in the transmission process, and improves transmission efficiency of the push-pressing force.

When the damping swing arm rotates from the folding position or the unfolding position to the position between the folding position and the unfolding position, the rolling body rolls into the guide surface of the protrusion from the first concave portion or the second concave portion, and the sliding member moves accordingly with the rolling body, so that the sliding member slides relative to the fixed base in the direction that is along the axis and that is away from the damping member, and pushes and presses the push-pressing member in the direction away from the damping member. In this way, the push-pressing force of the push-pressing member is increased, and the action force transferred by the push-pressing member to the rolling body by using the sliding member is increased. Further, the rolling body further increases, by using the guide surface inclined relative to the axis, the action force transferred by the sliding member to the rolling body, so that the action force of the rolling body on the guide surface is greater than the push-pressing force of the push-pressing member, and a damping force in a rotation process of the damping member is increased. Therefore, the damping swing arm can stably hover toward any position between the folding position and the unfolding position at the folding position or the unfolding position, the damping feedback obtained when the user rotates the damping swing arm is improved, and the comfortableness obtained when the user rotates the damping swing arm is enhanced.

In some embodiments, the first concave portion, the protrusion, and the second concave portion are located on an outer wall surface of a side wall of the damping member, and a surface that is of the protrusion and that faces away from the axis is the guide surface.

The contact portion of the sliding member is located on a side that is of the first concave portion, the protrusion, and the second concave portion and that faces away from the axis.

The fixed base has an abutting surface disposed toward the first concave portion, the protrusion, and the second concave portion, and the abutting surface abuts against a side that is of the rolling body and that faces away from the axis and/or a side that is of the contact portion and that faces away from the axis, so that the rolling body abuts against the outer wall surface of the side wall of the damping member in a direction facing the axis. When the rolling body presses against the guide surface, the push-pressing member generates a push-pressing force along the axis on the rolling body by using the sliding member, and the abutting surface directly generates or generates, on the rolling body by using the sliding member, an abut-pressing force that is in a direction perpendicular to the axis and that faces the axis. In this way, a greater resultant force on the damping member is generated, and the damping force generated when the damping swing arm rotates is increased.

In some embodiments, the protrusion uses a wedge-shaped curved-surface structure, and the protrusion has a first end portion close to the end of the damping member and a second end portion facing away from the end of the damping member, and a thickness of the protrusion increases in a direction from the first end portion to the second end portion.

In some embodiments, the guide surface is provided into a circular arc in the circumferential direction of the damping member. In this way, when the rolling body moves relative to the guide surface, the rolling body moves in a circular arc, so that a position of the rolling body in the direction of the axis remains unchanged. Displacement and a force of squeezing the push-pressing member by the sliding member remain unchanged. Therefore, when the damping swing arm rotates between the folding position and the unfolding position, the damping swing arm is subject to a uniform damping force, thereby improving the comfortableness of rotating the damping swing arm.

In some embodiments, the protrusion has a first transition surface and a second transition surface that are located on two sides of the guide surface and that are connected to the guide surface, the first transition surface is further connected to a bottom surface of the first concave portion, and the second transition surface is further connected to a bottom surface of the second concave portion, both the first transition surface and the second transition surface are inclined toward the first end portion of the protrusion, and when the damping swing arm rotates from the folding position or the unfolding position to the position between the folding position and the unfolding position, the rolling body moves along the first transition surface or the second transition surface in a direction facing the first end portion of the protrusion, to roll into the guide surface and push the push surface of the contact portion, so that the sliding member moves relative to the fixed base in a direction that is along the axis and that faces the push-pressing member.

In addition, when the damping swing arm rotates from an intermediate position to a position close to the folding position or rotates from an intermediate position to a position close to the unfolding position, the first transition surface or the second transition surface of the protrusion can guide the rolling body to automatically roll into the first concave portion or the second concave portion, so that the damping swing arm automatically rotates to the folding position or the unfolding position, thereby implementing effect of automatic opening and closing.

In some embodiments, a joint between the first transition surface and the first concave portion and a joint between the first transition surface and the guide surface each are provided with an arc-shaped corner, and a corner between the first transition surface and a tangent surface of a side edge of the guide surface is provided at an obtuse angle.

A joint between the second transition surface and the second concave portion and a joint between the second transition surface and the guide surface each are provided with an arc-shaped corner, and a corner between the second transition surface and a tangent surface of the other side edge of the guide surface is provided at an obtuse angle. In this way, a process in which the rolling body rolls into the guide surface along the first transition surface or the second transition surface is smoother, the rotation process of the damping swing arm is smoother, and abrasion caused when the rolling body collides with the first transition surface and the second transition surface is reduced.

In some embodiments, the first concave portion, the protrusion, and the second concave portion are disposed on an end face of a side wall of the damping member, and a surface that is of the protrusion and that faces the axis is the guide surface.

The contact portion of the sliding member is located on a side that is of the first concave portion, the protrusion, and the second concave portion and that faces away from the end face of the damping member, and abuts against a side that is of the rolling body and that faces away from the guide surface, and the push surface of the contact portion is inclined relative to the axis.

The fixed base has an abutting surface disposed toward the first concave portion, the protrusion, and the second concave portion, and the abutting surface abuts, along the axis, against a side that is of the rolling body and that faces away from the end face of the damping member.

When the damping swing arm rotates from the folding position or the unfolding position to the position between the folding position and the unfolding position, the rolling body pushes the push surface of the contact portion in a direction facing the axis, so that the sliding member slides in the direction away from the damping member relative to the fixed base. In this way, the push-pressing force of the push-pressing member is increased, and the action force transferred by the push-pressing member to the rolling body by using the sliding member is increased. Further, the rolling body further increases, by using the guide surface inclined relative to the axis, the action force transferred by the sliding member to the rolling body, so that the action force of the rolling body on the guide surface is greater than the push-pressing force of the push-pressing member, and the damping force in the rotation process of the damping member is increased. Therefore, the damping swing arm can stably hover toward any position between the folding position and the unfolding position at the folding position or the unfolding position, the damping feedback obtained when the user rotates the damping swing arm is improved, and the comfortableness obtained when the user rotates the damping swing arm is enhanced.

In some embodiments, the push surface has a first end and a second end, and the push surface extends from the first end to the second end in a direction that is perpendicular to the axis and that faces away from the axis, and extends in a direction that is along the axis and that faces an interior of the sliding member, so that an extension direction of the push surface from the first end to the second end is inclined relative to the axis.

In some embodiments, the guide surface of the protrusion has a first edge located on the end face of the damping member and a second edge facing away from the end face of the damping member, and a distance between the guide surface and the axis increases in a direction from the first edge to the second edge.

In some embodiments, the guide surface is provided into a circular arc in the circumferential direction of the damping member. In this way, when the rolling body moves relative to the guide surface, the rolling body moves in a circular arc that rotates around the axis, so that a position of the rolling body in a direction perpendicular to the axis remains unchanged. Displacement and a force of squeezing the push-pressing member by the sliding member remain unchanged. Therefore, when the damping swing arm rotates between the folding position and the unfolding position, the damping swing arm is subject to a uniform damping force, thereby improving the comfortableness of rotating the damping swing arm.

In some embodiments, the protrusion has a first transition surface and a second transition surface that are located on two sides of the guide surface and that are connected to the guide surface, the first transition surface is further connected to a bottom surface of the first concave portion, and the second transition surface is further connected to a bottom surface of the second concave portion, and when the damping swing arm rotates from the folding position or the unfolding position to the position between the folding position and the unfolding position, the rolling body rolls into the guide surface along the first transition surface or the second transition surface, and the first transition surface or the second transition surface of the protrusion and the abutting surface of the fixed base are opposite to each other to press against the rolling body, so that the rolling body moves in a direction that is perpendicular to the axis and that is close to the axis, and pushes the push surface of the contact portion, and the sliding member moves relative to the fixed base in a direction that is along the axis and that faces the push-pressing member.

In addition, when the damping swing arm rotates from an intermediate position to a position close to the folding position or rotates from an intermediate position to a position close to the unfolding position, the first transition surface or the second transition surface of the protrusion can guide the rolling body to automatically roll into the first concave portion or the second concave portion, so that the damping swing arm automatically rotates to the folding position or the unfolding position, thereby implementing effect of automatic opening and closing.

In some embodiments, a joint between the first transition surface and the first concave portion and a joint between the first transition surface and the guide surface each are provided with an arc-shaped corner, and a corner between the first transition surface and a tangent surface of a side edge of the guide surface is provided at an obtuse angle.

A joint between the second transition surface and the second concave portion and a joint between the second transition surface and the guide surface each are provided with an arc-shaped corner, and a corner between the second transition surface and a tangent surface of the other side edge of the guide surface is provided at an obtuse angle. In this way, a process in which the rolling body rolls into the guide surface along the first transition surface or the second transition surface is smoother, the rotation process of the damping swing arm is smoother, and abrasion caused when the rolling body collides with the first transition surface and the second transition surface is reduced.

In some embodiments, a connecting shaft is disposed on the fixed base, the damping member uses a sleeve structure and is sleeved on the connecting shaft, and the damping member is rotatably connected to the connecting shaft, so that the damping swing arm rotates forward or reversely around the connecting shaft relative to the fixed base, and the axis is an axis of the connecting shaft. Therefore, when the rolling body squeezes the damping member, friction resistance is generated due to squeezing between the damping member and the connecting shaft, thereby producing damping effect on rotating motion of the damping swing arm.

In some embodiments, the sliding member is slidably connected to the connecting shaft, and is capable of moving along the axis of the connecting shaft, and a side that is of the sliding member and that faces the push-pressing member is provided into a plane. In this way, pressure applied by the push-pressing member to the side of the sliding member can be distributed more evenly. This ensures that a sliding process of the sliding member and a force transmission process are more stable.

In some embodiments, the push-pressing member is an elastic member, the elastic member is sleeved on the connecting shaft, and the elastic member is elastically deformed along the axis of the connecting shaft, and applies the push-pressing force to the sliding member. In this way, the push-pressing member can provide a stable push-pressing force under constant deformation, and the damping effect of the damping member in the rotating motion is kept uniform.

In some embodiments, two symmetrically disposed damping members are disposed at the end of the damping swing arm, and the rolling body and the push-pressing apparatus are disposed, corresponding to the two damping members, at each of two ends that are of the end of the damping swing arm and that are along the axis. Disposing the two damping members can effectively increase the damping force applied to the damping swing arm. In addition, the damping members are symmetrically disposed, so that damping forces provided by the two damping members are balanced. In this way, rotation of the damping swing arm is more stable, and the damping effect is better.

An embodiment of this disclosure provides a hinge apparatus, including the damping mechanism in any one of the foregoing embodiments.

By using the foregoing technical solutions, a structure of the hinge apparatus is simpler and compact, and the action force of the rolling body on the damping member is greater than the push-pressing force of the push-pressing apparatus. In this way, the hinge apparatus can be accommodated in limited space inside a foldable electronic device, and a sufficient damping force is provided, thereby ensuring damping effect obtained when the hinge apparatus rotates.

In some embodiments, the hinge apparatus includes two symmetrically disposed damping mechanisms.

An embodiment of this application provides a foldable electronic device, including a first body and a second body, and further including the hinge apparatus in any one of the foregoing embodiments. The hinge apparatus is configured to drive the first body and the second body to be unfolded or folded relative to each other.

By using the foregoing technical solutions, the hinge apparatus has a smaller size, so that the hinge apparatus occupies smaller internal space of the first body and the second body. This is conducive to optimizing a layout of the internal space of the first body and the second body. In addition, the hinge apparatus has high durability, good damping effect, and low production costs, so that the foldable electronic device can have a longer service life of folding and unfolding. A damping comfortableness of folding or unfolding the first body and the second body relative to each other is improved. It is ensured that the first body and the second body can hover at any angle.

BRIEF DESCRIPTION OF DRAWINGS

FIG. 11 is a schematic diagram of a structure of a sliding member of a first damping mechanism according to an embodiment;

FIG. 12 is a schematic diagram of a structure existing when a sliding member of a first damping mechanism is viewed from another perspective according to an embodiment;

FIG. 13 is a perspective view of a structure at a position of a rolling body existing when a hinge apparatus is in a folding state according to an embodiment;

REFERENCE NUMERALS

Figure 1:
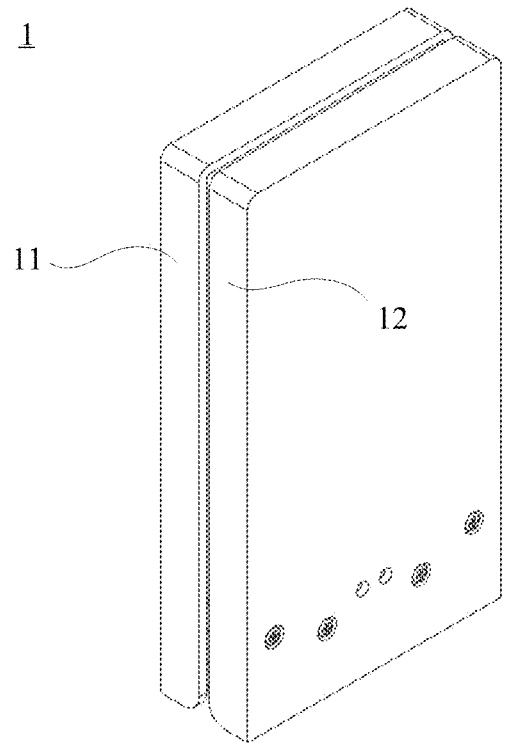
FIG. 1 is a schematic diagram of a structure of a foldable electronic device in a folding state according to an embodiment.

1: foldable electronic device;

11: first body; 12: second body;

20: hinge apparatus;

21: fixed base;

e: abutting surface;

22: first damping swing arm;

221: first damping member;

a: inner wall surface; b: outer wall surface; c: first end face; d: second end face;

222: second damping member;

223: first concave portion; 2231: first opening;

f: first bottom surface; g: first side surface; h: first transition surface; i: second side surface;

224: protrusion;

2241: first end portion; 2242: second end portion; j: guide surface; 2243: first edge; 2244: second edge;

225: second concave portion;

k: third side surface; m: second transition surface; n: fourth side surface;

23: second damping swing arm; 24: first connecting shaft; 25: second connecting shaft; 26: first rolling body; 27: second rolling body; 28: sliding member; 29: push-pressing member;

281: contact portion;

p: push surface; p1: first end; p2: second end;

31: first connecting member; 32: second connecting member;

40: synchronization mechanism;

41: first rotating arm; 42: second rotating arm; 43: transmission assembly;

411: first transmission gear; 421: second transmission gear;

L: length direction.

DESCRIPTION OF EMBODIMENTS

The following describes implementations of this disclosure by using specific embodiments. A person skilled in the art may easily understand other advantages and effect of this disclosure based on content disclosed in this specification. Although this disclosure is described with reference to some embodiments, it does not mean that features of this disclosure are limited to the implementations. On the contrary, a purpose of the descriptions of this disclosure with reference to the implementations is to cover another option or modification that may be derived according to claims of this disclosure. To provide a deep understanding of this disclosure, the following descriptions include many specific details. This disclosure may be alternatively implemented without using these details. In addition, to avoid confusion or obfuscation of a focus of this disclosure, some specific details are omitted from the descriptions. It should be noted that embodiments in this disclosure and features in embodiments may be mutually combined in a case of no conflict.

It should be noted that, in this specification, similar reference numerals and letters in the following accompanying drawings represent similar items. Therefore, once an item is defined in an accompanying drawing, the item does not need to be further defined or interpreted in the following accompanying drawings.

In the descriptions of this disclosure, it should be noted that orientation or position relationships indicated by terms "center", "above", "below", "left", "right", "vertical", "horizontal", "inner", "outer", and the like are orientation or position relationships based on the accompanying drawings, and are merely intended for ease of describing this disclosure and simplifying the descriptions, but are not intended to indicate or imply that a specified apparatus or element needs to have a specific orientation or be constructed and operated in a specific orientation. Therefore, this cannot be understood as a limitation on this disclosure. In addition, terms "first" and "second" are merely used for a purpose of description, and shall not be understood as an indication or implication of relative importance.

In the descriptions of this disclosure, it should be noted that, unless otherwise clearly specified and limited, terms "mount", "interconnect", and "connect" should be understood in a broad sense. For example, such terms may indicate a fixed connection, a detachable connection, or an integral connection; or may indicate direct interconnection, indirect interconnection through an intermediate medium, or internal communication between two elements. A person of ordinary skill in the art may understand specific meanings of the foregoing terms in this disclosure based on specific cases.

To make the objectives, technical solutions, and advantages of this disclosure clearer, the following further describes the implementations of this disclosure in detail with reference to the accompanying drawings.

Figure 2:
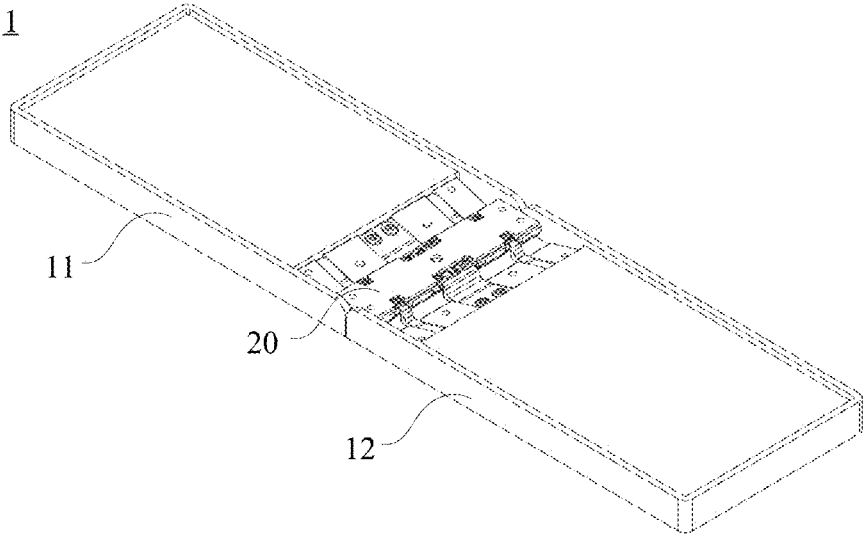
FIG. 2 is a schematic diagram of a structure of a foldable electronic device in an unfolding state according to an embodiment.

Refer to FIG. 1 and FIG. 2. FIG. 1 is a schematic diagram of a structure of a foldable electronic device in a folding state according to an embodiment of this disclosure. FIG. 2 is a schematic diagram of a structure of a foldable electronic device in an unfolding state according to an embodiment of this disclosure. As shown in FIG. 1 and FIG. 2, a foldable electronic device 1 includes a first body 11, a second body 12, and a hinge apparatus 20. The first body 11 and the second body 12 are rotatably connected through the hinge apparatus 20. When a user uses the foldable electronic device 1, the first body 11 and the second body 12 can be rotated relative to each other. For example, the first body 11 and the second body 12 are folded or unfolded relative to each other. In this way, the foldable electronic device 1 remains in a folding state (as shown in FIG. 1) or in an unfolding state (as shown in FIG. 2). Alternatively, the first body 11 and the second body 12 are rotated relative to each other, so that the first body 11 and the second body 12 are in an intermediate state (not shown in the figure) between a folding state and an unfolding state. The foldable electronic device 1 may be, but is not limited to, a foldable phone, a foldable tablet computer, a foldable notebook computer, a foldable display, a smart wearable device, or the like. In this embodiment, the foldable electronic device 1 is described by using a foldable phone as an example.

Figure 3:
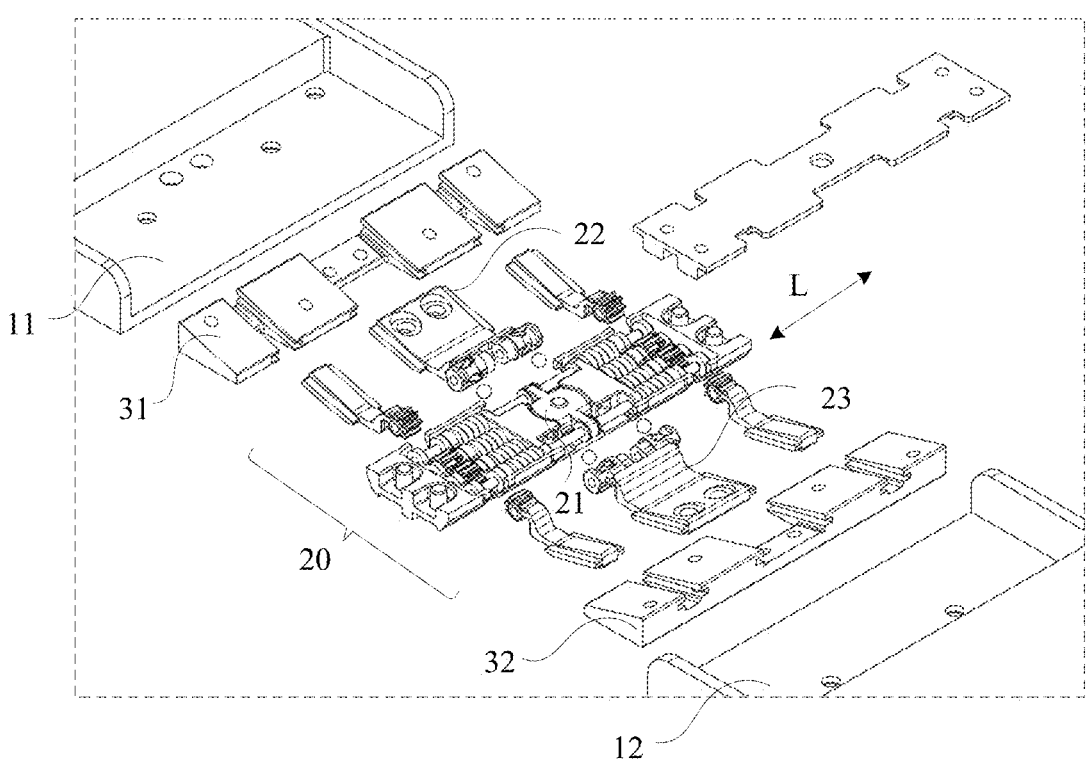
FIG. 3 is a schematic exploded diagram of a partial structure of a hinge apparatus of a foldable electronic device according to an embodiment.

Refer to FIG. 3. FIG. 3 is a schematic exploded diagram of a partial structure of a hinge apparatus of a foldable electronic device according to an embodiment of this disclosure. As shown in FIG. 3, the hinge apparatus 20 includes a fixed base 21, and a first damping swing arm 22 and a second damping swing arm 23 that are rotatably disposed on the fixed base 21. The first damping swing arm 22 is connected to the first body 11 through a first connecting member 31, and is configured to drive the first body 11 to rotate relative to the fixed base 21. The second damping swing arm 23 is connected to the second body 12 through a second connecting member 32, and is configured to drive the second body 12 to rotate relative to the fixed base 21. The person skilled in the art may understand that a plurality of connection manners may be used between the first damping swing arm 22 and the first body 11 and between the second damping swing arm 23 and the second body 12. In another alternative implementation, the first damping swing arm 22 may be directly connected to the first body 11, and the second damping swing arm 23 may be directly connected to the second body 12.

A damping mechanism is disposed in the hinge apparatus 20, so that the first damping swing arm 22 and the second damping swing arm 23 are impeded by a damping force in a rotation process. In this way, when the user folds or unfolds the first body 11 and the second body 12 relative to each other, the damping mechanism can provide the damping force that prevents the first body 11 and the second body 12 from being folded or unfolded relative to each other. Therefore, the user can feel obvious damping feedback when rotating the first body 11 and the second body 12. User operation comfortableness of relatively folding or relatively unfolding the foldable electronic device 1 is improved, and it is easier to control a rotation angle between the first body 11 and the second body 12. When the first body 11 and the second body 12 lose external action forces, a damping action of the hinge apparatus 20 can still enable the first body 11 and the second body 12 to hover in any intermediate state.

In addition, when the first body 11 and the second body 12 are in the folding state or the unfolding state, the damping mechanism can provide a damping force that limits relative rotation of the first body 11 and the second body 12, so that the first body 11 and the second body 12 remain stable in the folding state or the unfolding state.

Figure 4:
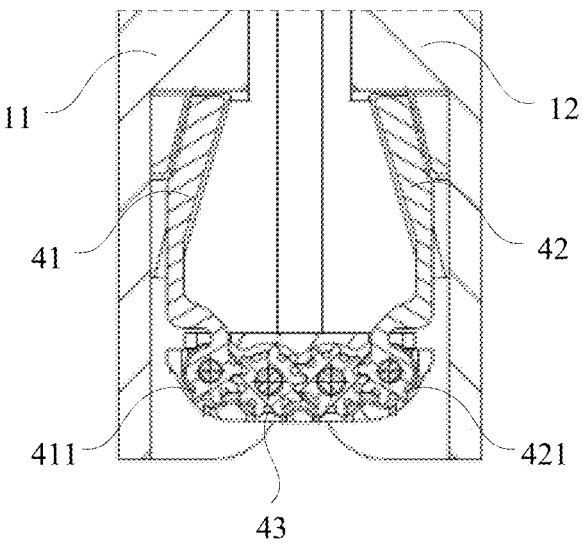
FIG. 4 is a schematic diagram of a cross-sectional structure of a synchronization mechanism of a foldable electronic device in a folding state according to an embodiment.
Figure 5:
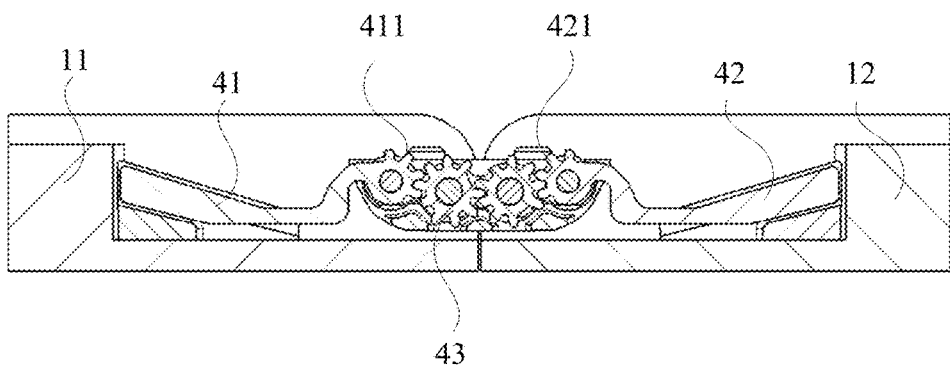
FIG. 5 is a schematic diagram of a cross-sectional structure of a synchronization mechanism of a foldable electronic device in an unfolding state according to an embodiment.

Refer to FIG. 4 and FIG. 5. FIG. 4 and FIG. 5 are schematic diagrams of cross-sectional structures of a synchronization mechanism of a foldable electronic device in a folding state and an unfolding state according to embodiments of this disclosure. As shown in FIG. 4 and FIG. 5, and understood with reference to FIG. 3, a synchronization mechanism 40 is disposed at each of two ends of the hinge apparatus 20 in a length direction L of the hinge apparatus 20, and the synchronization mechanisms 40 at the two ends are symmetrically disposed. In this way, the first body 11 and the second body 12 can rotate synchronously relative to the fixed base 21, so that good user experience of rotating the foldable electronic device 1 to obtain symmetric rotation is ensured. The synchronization mechanism 40 includes a first rotating arm 41, a second rotating arm 42, and a transmission assembly 43. Both the first rotating arm 41 and the second rotating arm 42 are rotatably disposed on the fixed base 21. A rotation axis of the first rotating arm 41 coincides with a rotation axis of the first damping swing arm 22, and the first rotating arm 41 is connected to the first connecting member 31, so that the first rotating arm 41 can rotate synchronously with the first damping swing arm 22 by using the first connecting member 31. A rotation axis of the second rotating arm 42 coincides with a rotation axis of the second damping swing arm 23, and the second rotating arm 42 is connected to the second connecting member 32, so that the second rotating arm 42 can rotate synchronously with the second damping swing arm 23 by using the second connecting member 32. Further, a first transmission gear 411 is disposed on an outer wall surface of one end that is of the first rotating arm 41 and that is close to the rotation axis. A second transmission gear 421 is disposed on an outer wall surface of one end that is of the second rotating arm 42 and that is close to the rotation axis. The first transmission gear 411 and the second transmission gear 421 are connected through the transmission assembly 43. The transmission assembly 43 includes two transmission gears rotatably disposed on a fixed support. In this way, the first rotating arm 41 and the second rotating arm 42 can rotate synchronously. In another alternative implementation, the transmission assembly 43 may not be disposed, and the first transmission gear 411 and the second transmission gear 421 are engaged to implement synchronous rotation. The person skilled in the art may understand that, the first rotating arm 41 and the second rotating arm 42 are not limited to gear transmission, and may alternatively use a plurality of transmission manners such as chain transmission and belt transmission, to implement synchronous rotation of the first rotating arm 41 and the second rotating arm 42.

Further, the person skilled in the art may understand that the two symmetrically disposed synchronization mechanisms 40 are used to achieve better synchronization effect between the first rotating arm 41 and the second rotating arm 42. In another alternative implementation, only a single synchronization mechanism 40 may be disposed, or more than three synchronization mechanisms 40 may be disposed when a length of the hinge apparatus 20 is long.

Further, the person skilled in the art may understand that, the synchronization mechanisms 40 are used to implement synchronous rotation of the first damping swing arm 22 and the second damping swing arm 23, so that the first body 11 and the second body 12 can rotate symmetrically and synchronously relative to the fixed base 21 of the hinge apparatus 20. Therefore, in another alternative implementation, the synchronization mechanism 40 may not be disposed, so that the first body 11 and the second body 12 can rotate independently relative to the fixed base 21 of the hinge apparatus 20.

Figure 6:
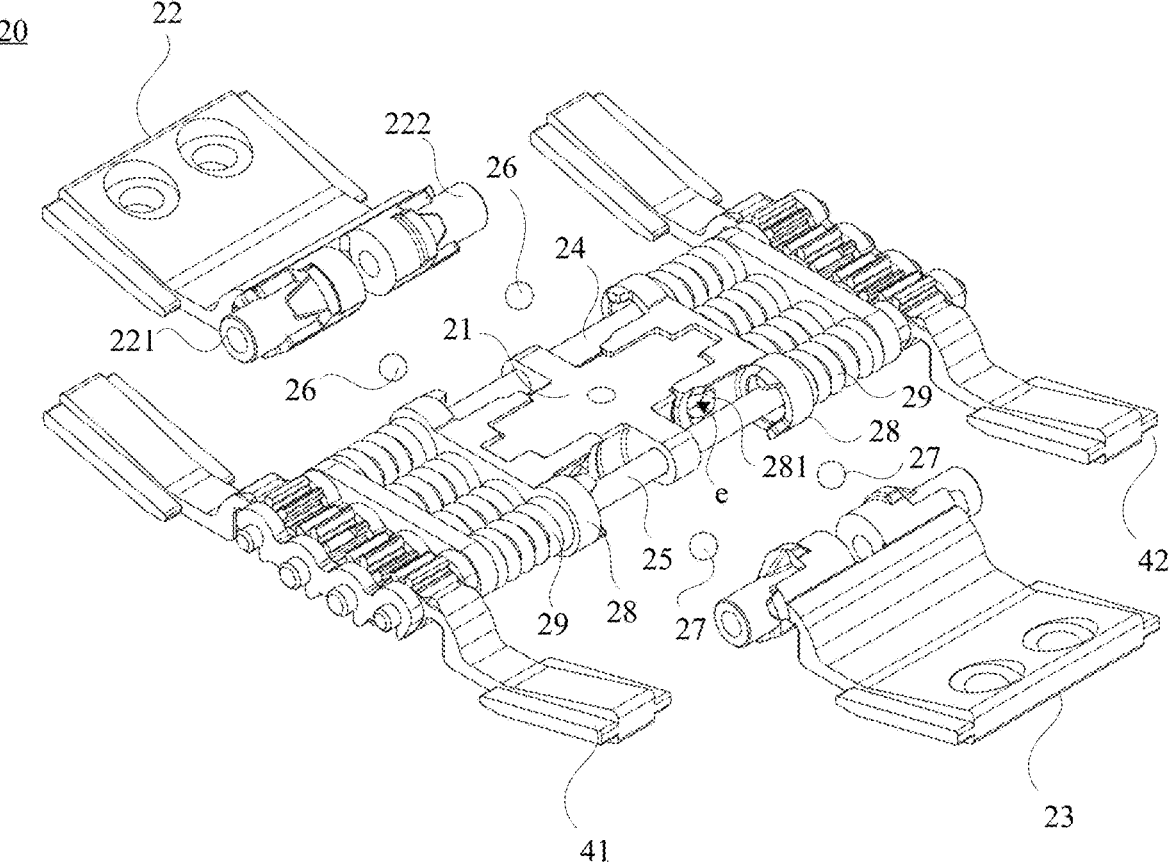
FIG. 6 is a schematic exploded diagram of a structure of a hinge apparatus according to an embodiment.
Figure 7:
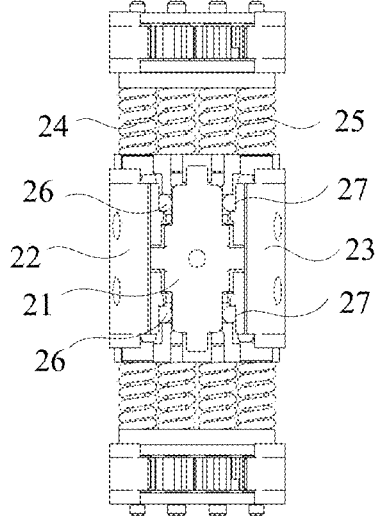
FIG. 7 is a top view of a structure of a hinge apparatus in a folding state according to an embodiment.
Figure 8:
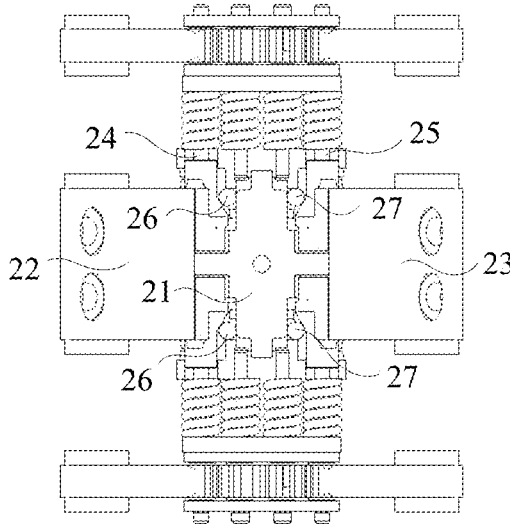
FIG. 8 is a top view of a structure of a hinge apparatus in an intermediate state according to an embodiment.
Figure 9:
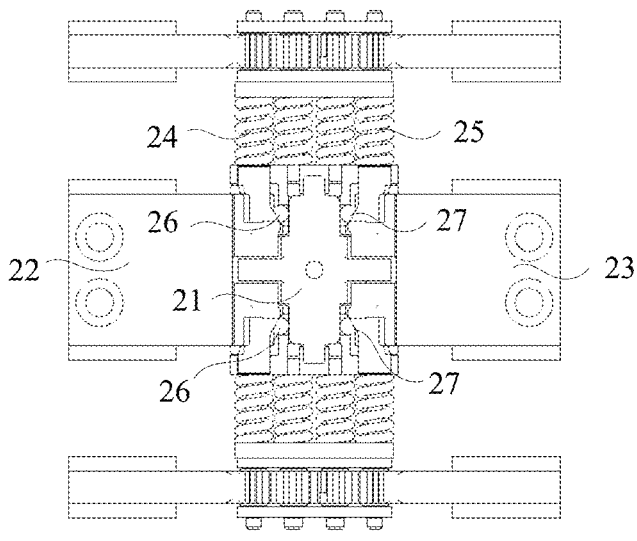
FIG. 9 is a top view of a structure of a hinge apparatus in an unfolding state according to an embodiment.

Refer to FIG. 6 to FIG. 9. FIG. 6 is a schematic exploded diagram of a structure of a hinge apparatus according to an embodiment of this disclosure. FIG. 7 to FIG. 9 are top views of structures of a hinge apparatus in a folding state, an intermediate state, and an unfolding state according to embodiments of this disclosure.

As shown in FIG. 6 to FIG. 9, the hinge apparatus 20 includes a first damping mechanism and a second damping mechanism that are symmetrically disposed. The first damping mechanism includes the fixed base 21, the first damping swing arm 22, a first rolling body 26, and a first push-pressing apparatus. The second damping mechanism includes the fixed base 21, the second damping swing arm 23, a second rolling body 27, and a second push-pressing apparatus. The first damping mechanism and the second damping mechanism share the same fixed base 21, and a first connecting shaft 24 and a second connecting shaft 25 that are parallel to each other are disposed on the fixed base 21. One end of the first damping swing arm 22 is rotatably disposed on the first connecting shaft 24, and the rotation axis of the first damping swing arm 22 is an axis of the first connecting shaft 24. One end of the second damping swing arm 23 is rotatably disposed on the second connecting shaft 25, and the rotation axis of the second damping swing arm 23 is an axis of the second connecting shaft 25. In this way, the first damping swing arm 22 and the second damping swing arm 23 can rotate forward or reversely relative to the fixed base 21 for switching of the first damping swing arm 22 and the second damping swing arm 23 between the folding position and the unfolding position. Therefore, the first damping swing arm 22 and the second damping swing arm 23 correspond to the folding state, the intermediate state, and the unfolding state of the hinge apparatus 20, and have the folding position, an intermediate position, and the unfolding position.

Further, the person skilled in the art may understand that the first damping mechanism and the second damping mechanism may alternatively be asymmetrically disposed. In the same hinge apparatus 20, the first damping mechanism and the second damping mechanism may alternatively use damping mechanisms with different structures, or only one damping mechanism is disposed.

Because the first damping mechanism and the second damping mechanism have a same structure and function, the following uses the first damping mechanism as an example for description.

Figure 10:
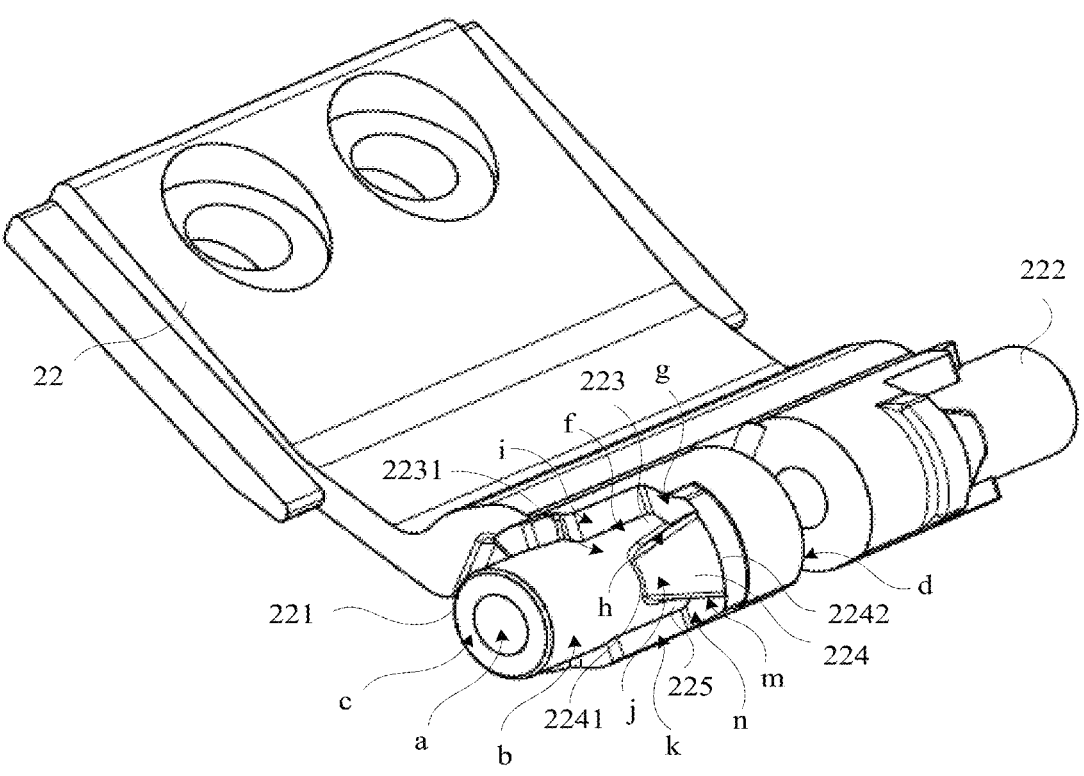
FIG. 10 is a schematic diagram of a structure of a first damping swing arm of a first damping mechanism according to an embodiment.

Refer to FIG. 10 to FIG. 12. FIG. 10 is a schematic diagram of a structure of a first damping swing arm of a first damping mechanism according to an embodiment of this disclosure. FIG. 11 and FIG. 12 are schematic diagrams of a structure of a sliding member of a first damping mechanism according to embodiments of this disclosure. As shown in FIG. 10, and understood with reference to FIG. 6, a first damping member 221 and a second damping member 222 are disposed at one end of the first damping swing arm 22 of the first damping mechanism. In an implementation, both the first damping member 221 and the second damping member 222 are disposed by using a sleeve structure. Both the first damping member 221 and the second damping member 222 are rotatably disposed on the first connecting shaft 24, so that the first damping swing arm 22 may rotate forward or reversely around the axis of the first connecting shaft 24 relative to the fixed base 21. The first damping member 221 and the second damping member 222 are symmetrically disposed on a plane perpendicular to the axis of the first connecting shaft 24. In another alternative implementation, the first damping member 221 and the second damping member 222 may use another structure that is rotatably disposed on the fixed base 21. For example, cantilever beams are disposed at two ends of the first damping member 221 and the second damping member 222, so that the first damping member 221 and the second damping member 222 are rotatably disposed on the fixed base 21 by using the cantilever beams.

A structure of the first damping member 221 is the same as a structure of the second damping member 222, and the first damping member 221 and the second damping member 222 are symmetrically disposed. Therefore, the following uses the first damping member 221 as an example for description. The person skilled in the art may understand that, the first damping member 221 and the second damping member 222 use the same structure and are symmetrically disposed, to improve stability of a rotation process of the first damping swing arm 22 and better balance friction forces between the first damping member 221 and the first connecting shaft 24 and between the second damping member 222 and the first connecting shaft 24. Therefore, in some implementations, the first damping member 221 and the second damping member 222 may alternatively use different structures. Further, in another alternative implementation, only a single damping member may be disposed at one end of the first damping swing arm 22.

The first damping member 221 includes an inner wall surface a corresponding to the first connecting shaft 24, an outer wall surface b that faces away from the first connecting shaft 24, and end faces located at the two ends of the first damping member 221. One end that is of the first damping member 221 and that faces away from the second damping member 222 is a first end face c, and one end that is of the first damping member 221 and that faces the second damping member 222 is a second end face d. The inner wall surface a of the first damping member 221 is in contact with and rotatably connected to the outer wall surface of the first connecting shaft 24. The fixed base 21 extends to a position between the first damping member 221 and the second damping member 222, and the second end face d of the first damping member 221 abuts against the fixed base 21. When interaction is formed between the inner wall surface a of the first damping member 221 and the outer wall surface of the first connecting shaft 24, and interaction is formed between the second end face d of the first damping member 221 and the fixed base 21, a friction force that hinders rotation of the first damping member 221 can be generated. In this way, a damping force that partially hinders rotation of the first damping swing arm 22 is formed, and damping effect in the rotation process of the first damping swing arm 22 is improved.

A first concave portion 223, a protrusion 224, and a second concave portion 225 that are sequentially connected in a circumferential direction of the first damping member 221 are disposed on the outer wall surface b of the first damping member 221. The protrusion 224 protrudes from the outer wall surface b of the first damping member 221, and the first concave portion 223 and the second concave portion 225 are recessed relative to the protrusion 224 in a direction facing the first connecting shaft 24.

The first rolling body 26 and the first push-pressing apparatus are disposed at a position that is in the fixed base 21 and that is close to the first end face c of the first damping member 221. The second rolling body 27 and the second push-pressing apparatus are disposed at an end that corresponds to the second damping member 222 and that faces away from the first damping member 221. Structures and functions of the first rolling body 26 and the first push-pressing apparatus are the same as structures and functions of the second rolling body 27 and the second push-pressing apparatus. The first rolling body 26 and the second rolling body 27, and the first push-pressing apparatus and the second push-pressing apparatus are symmetrically disposed. Therefore, the following uses the first rolling body 26 and the first push-pressing apparatus as an example for description.

In an implementation, the first rolling body 26 may be disposed by using a ball structure. The first push-pressing apparatus includes a sliding member 28 that is slidably disposed on the first connecting shaft 24 and a push-pressing member 29 that abuts against a side that is of the sliding member 28 and that faces away from the first end face c of the first damping member 221. The push-pressing member 29 is disposed by using a spring and sleeved on the first connecting shaft 24, to provide a push-pressing force on the sliding member 28 along the axis of the first connecting shaft 24. The person skilled in the art can understand that the push-pressing member 29 is used to provide a push-pressing force in a constant direction. Therefore, in another implementation, the push-pressing member 29 may alternatively be a structure that can provide a stable push-pressing force, like a pneumatic push-pressing apparatus, a motor push-pressing apparatus, or a rubber push-pressing member.

A side that is of the sliding member 28 and that faces the push-pressing member 29 is provided into a plane, so that pressure of the push-pressing member 29 can evenly act on the sliding member 28, and a sliding process of the sliding member 28 on the first connecting shaft 24 and a force transfer process are more stable. A contact portion 281 is disposed on a side that is of the sliding member 28 and that faces away from the push-pressing member 29. The contact portion 281 corresponds to the first concave portion 223, the protrusion 224, and the second concave portion 225 of the first damping member 221. A push surface p is provided on the contact portion 281. In addition, the first rolling body 26 is disposed on the contact portion 281 in a rolling manner, and abuts against the push surface p of the contact portion 281, so that the sliding member 28 transfers the push-pressing force of the push-pressing member 29 to the first rolling body 26 by using the push surface p of the contact portion 281. In this way, the first rolling body 26 presses against the first concave portion 223, the protrusion 224, or the second concave portion 225. In an implementation, the push surface p is perpendicular to the axis of the first connecting shaft 24. The person skilled in the art may understand that the push surface p of the contact portion 281 is used to transfer an action force between the first rolling body 26 and the sliding member 28. Therefore, in another implementation, the push surface p may alternatively be disposed in an inclined manner relative to the axis of the first connecting shaft 24.

In addition, the fixed base 21 has an abutting surface e disposed toward the first concave portion 223, the protrusion 224, and the second concave portion 225. The abutting surface e abuts against a side that is of the first rolling body 26 and the contact portion 281 and that faces away from the first connecting shaft 24. In this way, the first rolling body 26 abuts against the first concave portion 223, the protrusion 224, or the second concave portion 225 in the direction facing the first connecting shaft 24, and movement of the first rolling body 26 in a direction perpendicular to the first connecting shaft 24 is limited. In this way, the first rolling body 26 can apply a sufficient action force to the first concave portion 223, the protrusion 224, or the second concave portion 225 of the first damping member 221, so that an interaction force is formed between the first rolling body 26 and the first concave portion 223, between the first rolling body 26 and the protrusion 224, or between the first rolling body 26 and the second concave portion 225. In this way, the friction force that hinders the rotation of the first damping member 221 is generated in a rotation process of the first damping member 221, and the damping force that hinders the rotation of the first damping swing arm 22 is generated (the damping force is a main damping force applied to the first damping swing arm 22 during rotation). Therefore, the damping effect in the rotation process of the first damping swing arm 22 is improved.

The first concave portion 223 includes: a first bottom surface f supporting the first rolling body 26, where the first bottom surface f is flush with the outer wall surface b of the first damping member 221; a first side surface g and a first opening 2231 that are provided opposite to each other along of the axis of the first connecting shaft 24; and a first transition surface h and a second side surface i that are provided opposite to each other in a circumferential direction of the first connecting shaft 24. The first side surface g is separately connected to the first bottom surface f, the second side surface i, and the first transition surface h. The first transition surface h is separately connected to the first bottom surface f and the first side surface g.

Figure 14:
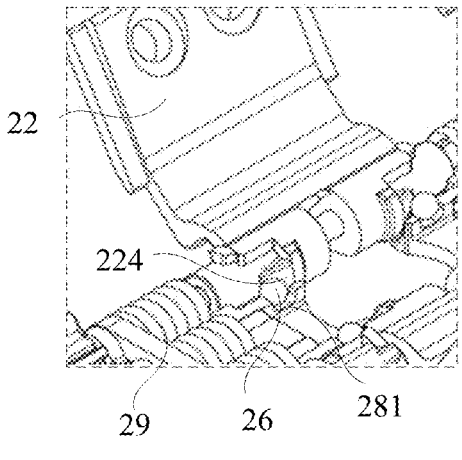
FIG. 14 is a perspective view of a structure at a position of a rolling body existing when a hinge apparatus is in an intermediate state according to an embodiment.
Figure 15:
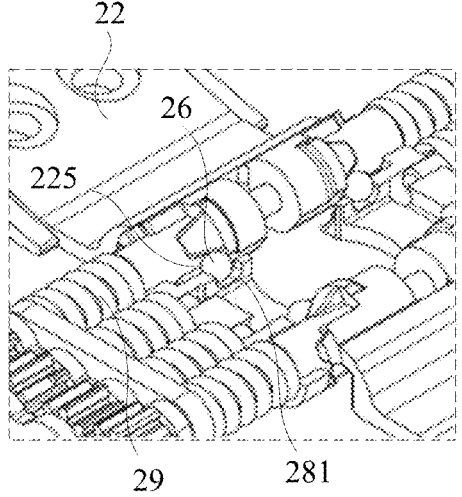
FIG. 15 is a perspective view of a structure at a position of a rolling body existing when a hinge apparatus is in an unfolding state according to an embodiment.
Figure 16:
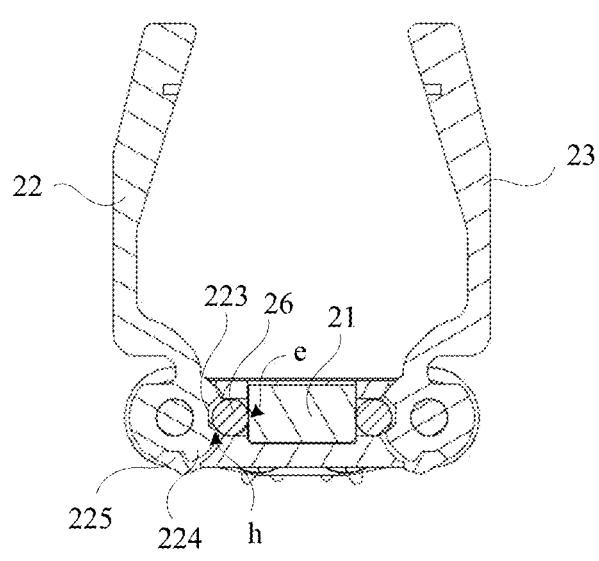
FIG. 16 is a cross-sectional view of a structure at a position of a rolling body existing when a hinge apparatus is in a folding state according to an embodiment.
Figure 17:
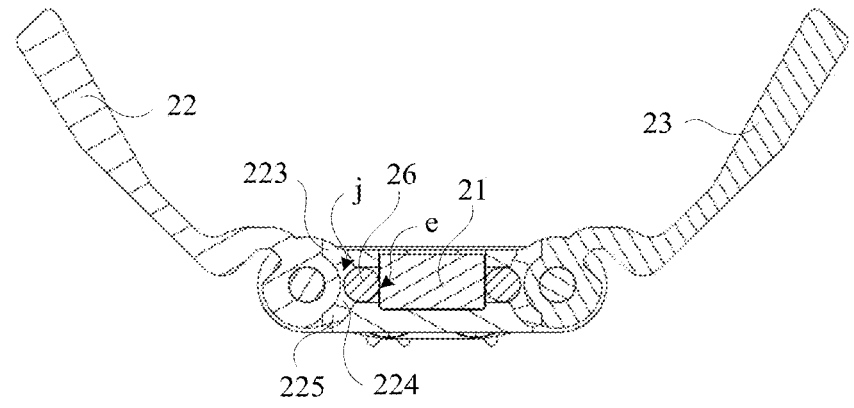
FIG. 17 is a cross-sectional view of a structure at a position of a rolling body existing when a hinge apparatus is in an intermediate state according to an embodiment.
Figure 18:
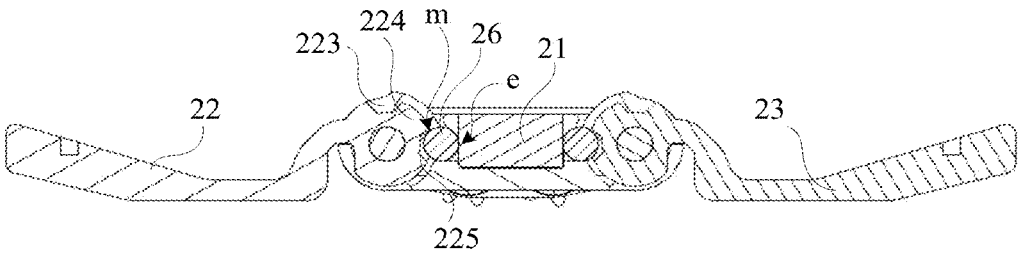
FIG. 18 is a cross-sectional view of a structure at a position of a rolling body existing when a hinge apparatus is in an unfolding state according to an embodiment.
Figure 19:
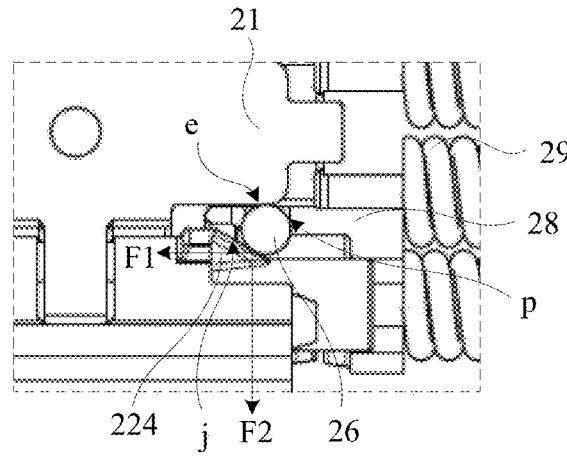
FIG. 19 is an enlarged schematic diagram of a partial structure at a position of a rolling body existing when a hinge apparatus is in an intermediate state according to an embodiment.
Figure 20:
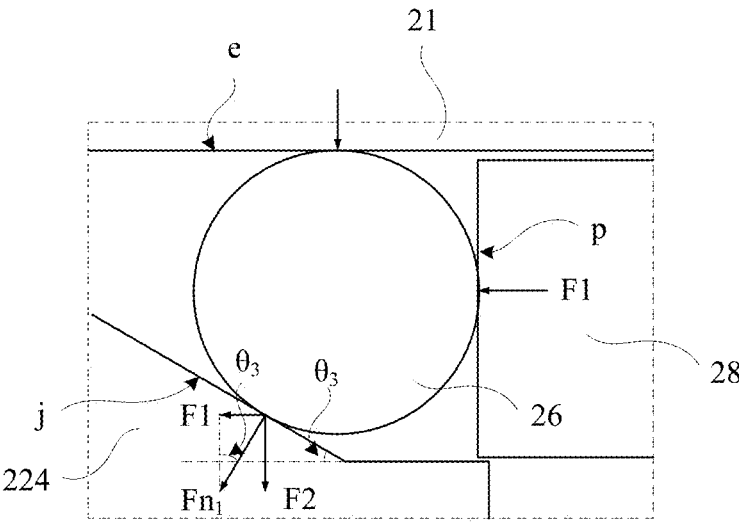
FIG. 20 is a schematic diagram of force analysis of the rolling body and a guide surface in FIG. 19.
Figure 21:
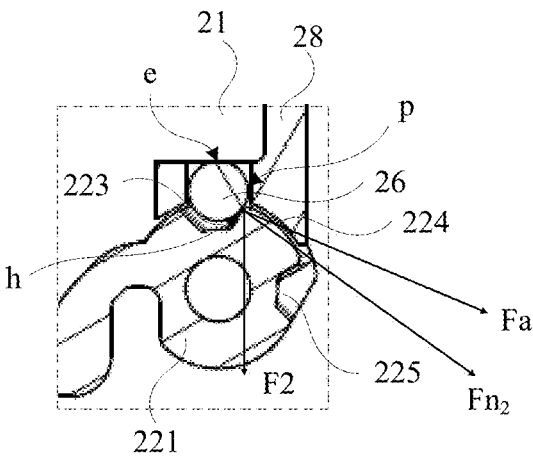
FIG. 21 is a cross-sectional view of a partial structure at a position of a rolling body existing when a hinge apparatus rotates from a folding state to an intermediate state according to an embodiment.

Refer to FIG. 13 to FIG. 23. FIG. 13 to FIG. 15 are perspective views of structures at positions of a rolling body existing when a hinge apparatus is in a folding state, an intermediate state, and an unfolding state according to embodiments of this disclosure. FIG. 16 to FIG. 18 are cross-sectional views of structures at positions of a rolling body existing when a hinge apparatus is in a folding state, an intermediate state, and an unfolding state according to embodiments of this disclosure. FIG. 19 is an enlarged schematic diagram of a partial structure at a position of a rolling body existing when a hinge apparatus is in an intermediate state according to an embodiment of this disclosure. FIG. 20 is a schematic diagram of force analysis of the rolling body and a guide surface in FIG. 19 according to an embodiment of this disclosure. FIG. 21 is a cross-sectional view of a partial structure at a position of a rolling body existing when a hinge apparatus is in a folding state according to an embodiment of this disclosure. FIG. 22A and FIG. 22B are schematic diagrams of force analysis of the rolling body in FIG. 21 according to embodiments of this disclosure.

As shown in FIG. 13, FIG. 16, FIG. 21, FIG. 22A, and FIG. 22B, and understood with reference to FIG. 6, FIG. 7, and FIG. 10, when the first damping swing arm 22 is at the folding position, the first rolling body 26 abuts in the first concave portion 223 of the first damping member 221. In this case, the push-pressing member 29 applies the push-pressing force to the sliding member 28 along the axis of the first connecting shaft 24. The sliding member 28 transfers pressure to the first rolling body 26 by using the push surface p of the contact portion 281, and applies the pressure to the first rolling body 26 along the axis of the first connecting shaft 24, so that the first rolling body 26 is pushed and pressed by the sliding member 28 to abut against the first side surface g of the first concave portion 223. Therefore, movement of the first rolling body 26 in the direction of the axis of the first connecting shaft 24 is limited. In addition, the first transition surface h and the second side surface i that are on two sides of the first rolling body 26 limit movement of the first rolling body 26 in the circumferential direction of the first connecting shaft 24, so that the first damping member 221 is clamped with the sliding member 28 by using the first rolling body 26, and a damping force that limits rotation of the first damping member 221 relative to the first connecting shaft 24 is formed. Therefore, the first damping swing arm 22 is stably kept at the folding position.

The protrusion 224 uses a wedge-shaped curved-surface structure. The protrusion 224 has a first end portion 2241 close to the first end face c of the first damping member 221 and a second end portion 2242 close to the second end face d of the first damping member 221. The protrusion 224 has a guide surface j facing away from the first connecting shaft 24, the guide surface j is connected to the first transition surface h, and the first transition surface h is inclined toward the first end portion 2241 of the protrusion 224.

Figure 22A:
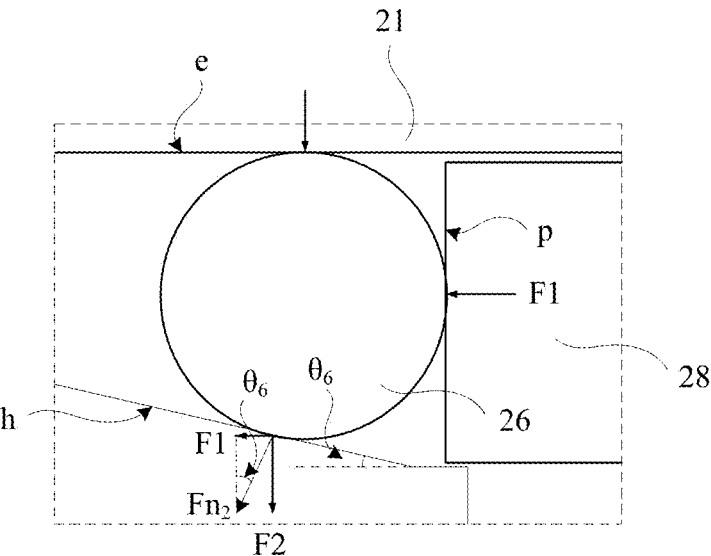
FIG. 22A is a schematic diagram of force analysis of the rolling body in FIG. 21.
Figure 22B:
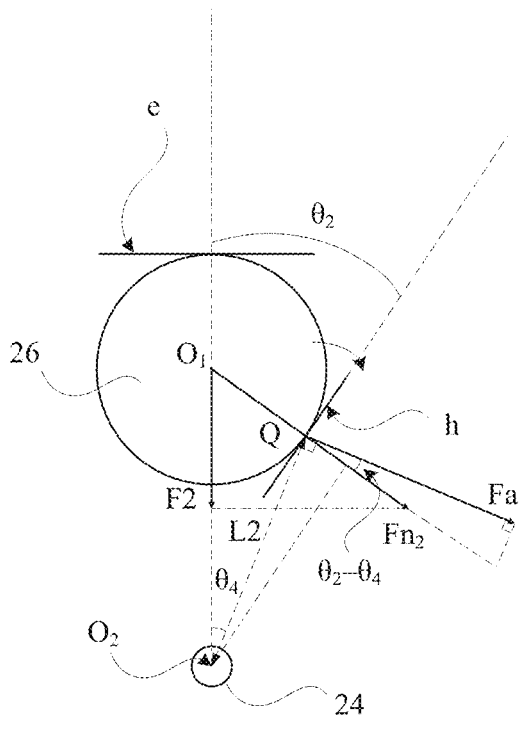
FIG. 22B is a schematic diagram of force analysis existing when the rolling body in FIG. 21 is viewed from another perspective.

As shown in FIG. 21 to FIG. 22B, FIG. 22A is a schematic diagram of force analysis on a plane parallel to a direction of an axis of a first connecting shaft 24. FIG. 22B is a schematic diagram of force analysis on a plane perpendicular to a direction of an axis of a first connecting shaft 24. When the first damping swing arm 22 rotates from the folding position to the intermediate position under an action of an external force, sufficient rotation torque is first applied to the first damping swing arm 22, so that the first rolling body 26 applies an action force $Fn_2$ to the first transition surface h. As shown in FIG. 22A, the action force $Fn_2$ of the first rolling body 26 on the first transition surface h may be decomposed into a component force F1 parallel to the axis of the first connecting shaft 24 and a component force F2 perpendicular to the axis of the first connecting shaft 24 (a direction of the component force F2 faces the axis of the first connecting shaft 24). In this case, the component force F1 is provided by the push-pressing force of the push-pressing member 29 for pushing the sliding member 28 (in this implementation, the push-pressing force of the push-pressing member 29 is an elastic force of the spring). F2 is provided by a support force of the abutting surface e. An inclination angle of the first transition surface h relative to the axis of the first connecting shaft 24 is $\theta_6$. Therefore, it may be obtained that $F2=F1/\tan \theta_6$.

As shown in FIG. 22B, an inclination angle of the first transition surface h relative to a connection line between a circle center $O_1$ of the first rolling body 26 and an axis center $O_2$ of the first connecting shaft 24 is $\theta_2$. An included angle between the connection line $O_1O_2$ and a connection line $QO_2$ is $\theta_4$. $O_1$ is the circle center of the first rolling body 26, $O_2$ is the axis center of the first connecting shaft 24, and Q is a contact point of the first rolling body 26 on the first transition surface h. The action force $Fn_2$ of the first rolling body 26 on the first transition surface h may be further decomposed into a torsion force Fa that hinders the rotation of the first damping swing arm 22 (in this case, a direction of the torsion force Fa is opposite to a rotation direction of the first damping swing arm 22). Therefore, it may be obtained that a magnitude of Fa is $(F2/\sin \theta_2)*\cos(\theta_2-\theta_4)$. After $F2=F1/\tan \theta_6$ is substituted, it may be obtained that $Fa=(F1/(\tan \theta_6*\sin \theta_2))*\cos(\theta_2-\theta_4)$. In addition, a rotation force arm of the torsion force Fa is a distance L2 between the contact point Q of the first rolling body 26 on the first transition surface h and the axis center $O_2$ of the first connecting shaft 24. Therefore, it may be obtained that when the first damping swing arm 22 rotates from the folding position to the intermediate position, rotation torque applied by the first rolling body 26 to the first transition surface h is Fa*L2. In an implementation, appropriate angles of $\theta_2$, $\theta_4$, and $\theta_6$ are set, so that Fa may be greater than F1.

In addition, under an action of an external force, the first rolling body 26 moves in an inclination direction of the first transition surface h and toward the first end portion 2241 of the protrusion 224, so that the first rolling body 26 pushes the push surface p of the contact portion 281, to drive the sliding member 28 to move synchronously in a direction facing the push-pressing member 29. In this way, the sliding member 28 squeezes the push-pressing member 29. This increases elastic deformation of the push-pressing member 29 and the push-pressing force of the push-pressing member 29. In addition, the first damping member 221 rotates relative to the sliding member 28, so that the first rolling body 26 in the contact portion 281 rolls out from the first opening 2231 of the first concave portion 223 of the first damping member 221, and rolls to the guide surface j of the protrusion 224.

Therefore, in a process in which the first damping swing arm 22 rotates from the folding position to the intermediate position, when the first rolling body 26 abuts against the first transition surface h, the first rolling body 26 can form action forces F1, F2, and Fa (in an implementation, Fa is greater than F1) in three different directions on the first transition surface h. In this way, effect of an elastic force of the push-pressing member 29 (a magnitude of the elastic force of the push-pressing member 29 is only F1) on the first damping member 221 is enhanced, the friction force applied to the first damping member 221 is increased, and the damping effect in the rotation process of the first damping swing arm 22 is enhanced.

When the first damping swing arm 22 rotates from the intermediate position to the folding position, and the first rolling body 26 rolls from the protrusion 224 to the first transition surface h, rotation torque applied by the first rolling body 26 to the first transition surface h is Fa*L2 (in this case, a direction of a torsion force Fa is the same as a rotation direction of the first damping swing arm 22, and in an implementation, Fa is greater than F1). In this way, the first damping swing arm 22 can automatically rotate to the folding position, and is stably kept at the folding position. Therefore, effect of automatic folding is implemented.

Further, a joint between the first transition surface h and the bottom surface of the first concave portion 223 and a joint between the first transition surface h and the guide surface j each are provided with an arc-shaped corner radius, and a corner between the first transition surface h and a tangent surface of a side edge of the guide surface j is provided at an obtuse angle. In this way, a process in which the first rolling body 26 rolls from the first concave portion 223 to the guide surface j is smoother, and a process in which the first damping swing arm 22 rotates from the folding position to the intermediate position is smoother. Therefore, a friction sense in the rotation process of the first damping swing arm 22 is reduced, and comfortableness of rotating the first damping swing arm 22 is improved.

A thickness of the protrusion 224 increases in a direction from the first end portion 2241 to the second end portion 2242, so that the guide surface j is in an inclined state relative to the first connecting shaft 24. The guide surface j is provided into a circular arc in the circumferential direction of the first connecting shaft 24. In an implementation, a circle center of the circular arc is located on the axis of the first connecting shaft 24. The person skilled in the art may understand that, in another alternative implementation, the circle center of the circular arc may not be located on the axis of the first connecting shaft 24.

As shown in FIG. 14, FIG. 16, FIG. 19, and FIG. 20, and understood with reference to FIG. 6, FIG. 8, and FIG. 10, when the first damping swing arm 22 is at the intermediate position, the first rolling body 26 abuts against the guide surface j, the guide surface j supports the first rolling body 26 in an inclined state relative to the first connecting shaft 24, and an inclination angle of the guide surface j is $\theta_3$. In this case, the sliding member 28 applies, to the first rolling body 26, a push-pressing force in a direction parallel to the axis of the first connecting shaft 24, and the abutting surface e of the fixed base 21 directly applies an abutting force in a direction perpendicular to the axis of the first connecting shaft 24 to the first rolling body 26. In this way, the first rolling body 26 forms, under an action of the sliding member 28 and the abutting surface e, a resultant force $Fn_1$ perpendicular to the guide surface j on the guide surface j. Effect of the resultant force $Fn_1$ on the guide surface j of the first damping member 221 may be decomposed into a component force F1 in the direction parallel to the axis and a component force F2 perpendicular to the axis, and $F2=F1/\tan(\theta_3)$. In an implementation, an appropriate $\theta_3$ is set, so that F2 may be greater than F1. The component force F1 enables an interaction force with a magnitude of F1 to be generated between the second end face d of the first damping member 221 and the fixed base 21, and the component force F2 enables an interaction force with a magnitude of F2 to be generated between the inner wall surface a of the first damping member 221 and the outer wall surface of the first connecting shaft 24. In this case, F1 is the push-pressing force of the push-pressing member 29 (that is, the elastic force of the spring). An action force with a magnitude of the resultant force $Fn_1$ ($Fn_1$ is equal to $F1/\sin \theta_3$) is simultaneously generated between the first rolling body 26 and the guide surface j.

Therefore, compared with another technology, in this solution, the resultant force $Fn_1$ of the first rolling body 26 on the first damping member 221 is greater than the push-pressing force F1 of the push-pressing member 29, and the component force F2 that is generated by the first rolling body 26 on the first damping member 221 and that is perpendicular to the direction of the first connecting shaft 24 is greater than the push-pressing force F1 of the push-pressing member 29. In this way, an action force generated by the push-pressing force F1 of the push-pressing member 29 on the first damping member 221 is amplified, and the damping force in the rotation process of the first damping member 221 is increased. Therefore, the first damping swing arm 22 can stably hover toward any position between the folding position and the unfolding position at the folding position or the unfolding position, damping feedback obtained when the user rotates the first damping swing arm 22 is improved, and comfortableness obtained when the user rotates the first damping swing arm 22 is enhanced.

As shown in FIG. 15 and FIG. 18, and understood with reference to FIG. 6, FIG. 9, and FIG. 10, the second concave portion 225 includes a second bottom surface supporting the first rolling body 26, where the second bottom surface is flush with the outer wall surface b of the first damping member 221; a third side surface k and a second opening that are provided opposite to each other along the axis of the first connecting shaft 24, and a second transition surface m and a fourth side surface n that are provided opposite to each other in the circumferential direction of the first connecting shaft 24. The third side surface k is separately connected to the second bottom surface, the fourth side surface n, and the second transition surface m. The second transition surface m is separately connected to the guide surface j, the second bottom surface, and the third side surface k. The second transition surface m is inclined toward the first end portion 2241 of the protrusion 224.

When the first damping swing arm 22 rotates from the intermediate position to the unfolding position under an action of an external force, the first rolling body 26 rolls into the second transition surface m from the guide surface j. In this case, the first rolling body 26 loses support of the guide surface j, so that the first rolling body 26 rolls along the second transition surface m to the second bottom surface of the second concave portion 225. In addition, the first rolling body 26 rolls, under an action of pushing and pressing of the sliding member 28 in the direction parallel to the axis of the first connecting shaft 24, in a direction facing away from the push-pressing member 29. In this case, the first rolling body 26 is subject to a support force of the second transition surface m. The first rolling body 26 applies, to the second transition surface m, a torsion force Fa' (in this case, a direction of the torsion force Fa' is the same as a rotation direction of the first damping swing arm 22) that drives the first damping member 221 to rotate toward the unfolding position. For a magnitude of the torsion force Fa' and magnitudes of component forces in different directions, refer to the foregoing analysis of Fa. When the first transition surface h and the second transition surface m are symmetrically provided, Fa and Fa' have the same magnitude. In this way, the first damping swing arm 22 can automatically roll into the second concave portion 225 under an action of pushing of the first rolling body 26, so that the first damping swing arm 22 is automatically unfolded when approaching the unfolding position.

When the first damping swing arm 22 rotates from the unfolding position to the intermediate position, a torsion force Fa' (in this case, a direction of the torsion force Fa' is opposite to a rotation direction of the first damping swing arm 22) applied by the first rolling body 26 to the second transition surface m performs a function of hindering the rotation of the first damping swing arm 22. In addition, the first rolling body 26 further applies, to the second transition surface m, a component force F1' parallel to the axis of the first connecting shaft 24 and a component force F2' perpendicular to the axis of the first connecting shaft 24. This increases the friction force applied to the first damping member 221. In this way, a damping force generated when the first damping swing arm 22 rotates from the unfolding position to the intermediate position is increased. Comfortableness obtained when the first damping swing arm 22 rotates can be improved. In addition, the first damping swing arm 22 can be stably kept at the unfolding position.

Further, a joint between the second transition surface m and the second bottom surface of the second concave portion 225 and a joint between the second transition surface m and the guide surface j are provided with an arc-shaped corner radius, and a corner between the second transition surface m and a tangent surface of a side edge of the guide surface j is provided at an obtuse angle. In this way, a process in which the first rolling body 26 rolls from the guide surface j to the second concave portion 225 is smoother, and a process in which the first damping swing arm 22 rotates from the intermediate position to the unfolding position is smoother. Therefore, a friction sense in the rotation process of the first damping swing arm 22 is reduced, and the comfortableness of rotating the first damping swing arm 22 is improved.

When the first damping swing arm 22 is at the unfolding position, the first rolling body 26 abuts in the second concave portion 225 of the first damping member 221. In this case, the push-pressing member 29 applies the push-pressing force to the sliding member 28 along the axis of the first connecting shaft 24. The sliding member 28 transfers pressure to the first rolling body 26 by using the push surface p of the contact portion 281, and applies the pressure to the first rolling body 26 along the axis of the first connecting shaft 24, so that the first rolling body 26 is pushed and pressed by the sliding member 28 to abut against the third side surface k of the second concave portion 225. Therefore, movement of the first rolling body 26 in the direction of the axis of the first connecting shaft 24 is limited. In addition, the second transition surface m and the fourth side surface n that are on two sides of the first rolling body 26 limit movement of the first rolling body 26 in the circumferential direction of the first connecting shaft 24, so that the first damping member 221 is clamped with the sliding member 28 by using the first rolling body 26, and a damping force that limits rotation of the first damping member 221 relative to the first connecting shaft 24 is formed. Therefore, the first damping swing arm 22 is stably kept at the unfolding position.

The person skilled in the art may understand that, when the first damping swing arm 22 rotates from the unfolding position to the folding position, the first rotating arm 41 can also hover at any intermediate position. When the first damping swing arm 22 rotates from the intermediate position to the folding position under an action of an external force, the first damping swing arm 22 can also be automatically folded when the first damping swing arm 22 approaches the folding position, with no need to apply an external force.

Figure 23:
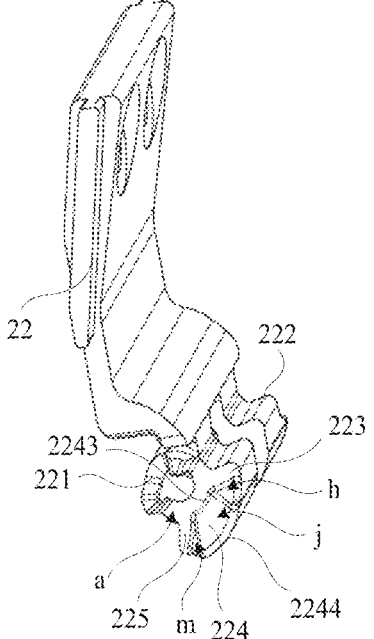
FIG. 23 is a schematic diagram of a structure of a first damping swing arm of a first damping mechanism according to another embodiment.
Figure 24:
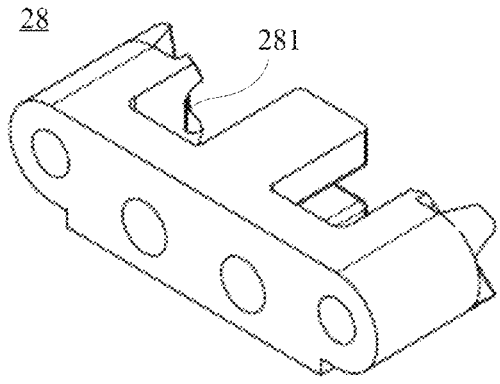
FIG. 24 is a schematic diagram of a structure of a sliding member of a first damping mechanism according to another embodiment.
Figure 25:
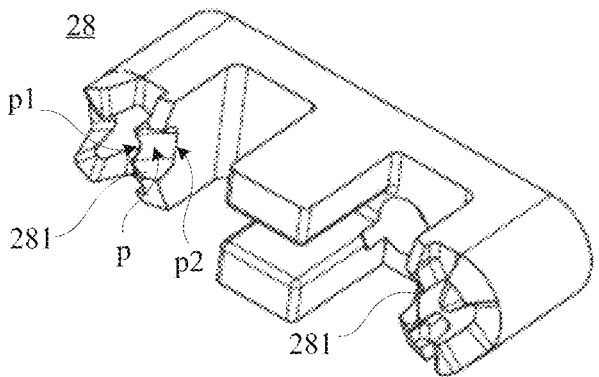
FIG. 25 is a schematic diagram of a structure existing when a sliding member of a first damping mechanism is viewed from another perspective according to another embodiment.
Figure 26:
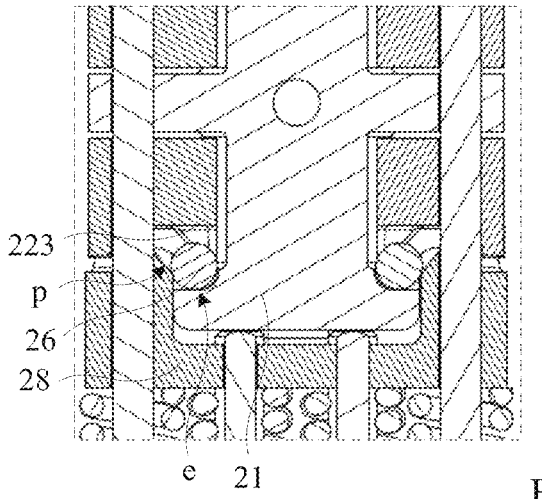
FIG. 26 is a cross-sectional top view of a structure of a hinge apparatus in a folding state according to another embodiment.
Figure 27:
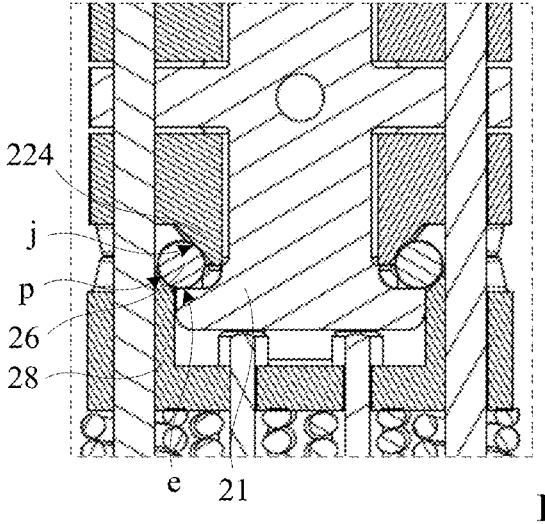
FIG. 27 is a cross-sectional top view of a structure of a hinge apparatus in an intermediate state according to another embodiment.
Figure 28:
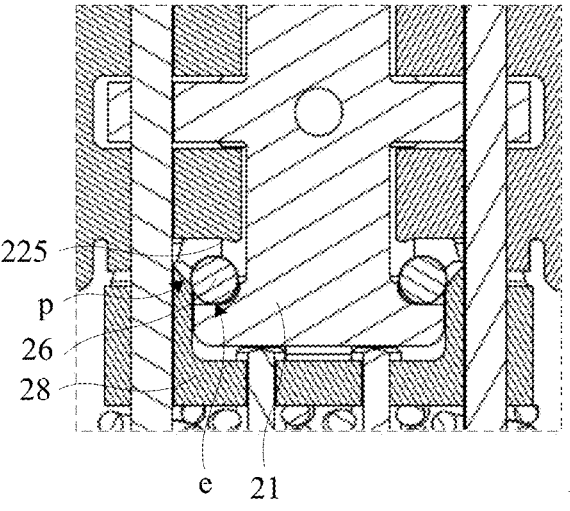
FIG. 28 is a cross-sectional top view of a structure of a hinge apparatus in an unfolding state according to another embodiment.
Figure 29:
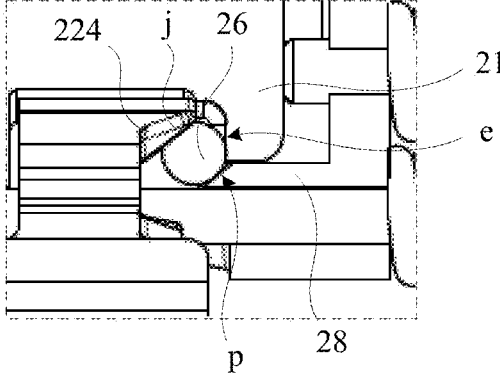
FIG. 29 is an enlarged schematic diagram of a partial structure at a position of a rolling body existing when a hinge apparatus is in an intermediate state according to another embodiment.
Figure 30:
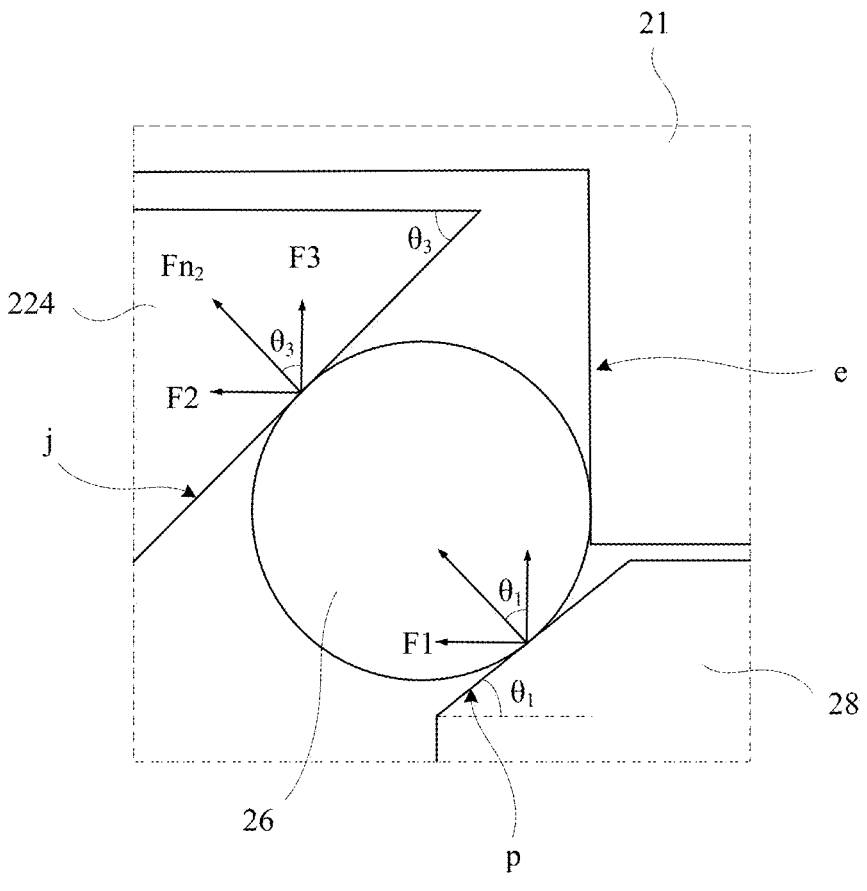
FIG. 30 is a schematic diagram of force analysis of the rolling body in FIG. 29.
Figure 31:
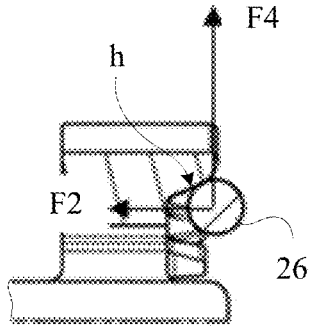
FIG. 31 is a cross-sectional view of a partial structure at a position of a rolling body existing when a hinge apparatus is in a folding state according to another embodiment.
Figure 32:
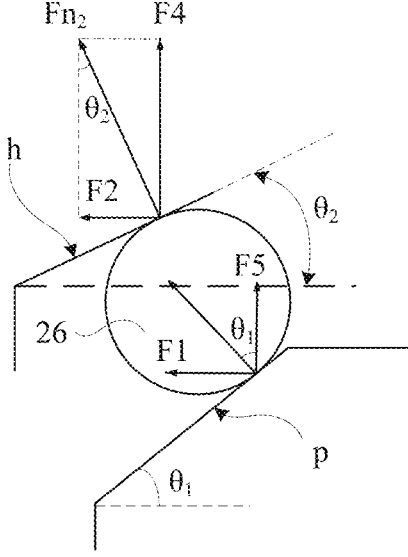
FIG. 32 is a schematic diagram of force analysis of the rolling body in FIG. 31.
Figure 33:
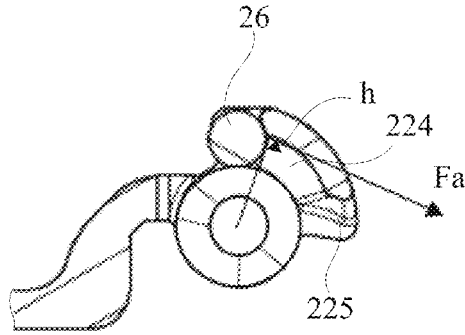
FIG. 33 is a cross-sectional view of a partial structure at a position that is viewed from another perspective and that is of a rolling body existing when a hinge apparatus is in a folding state according to another embodiment.
Figure 34:
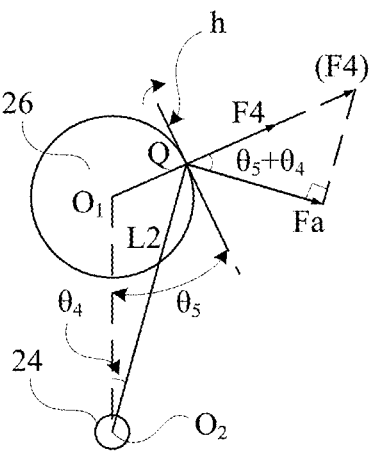
FIG. 34 is a schematic diagram of force analysis of the rolling body in FIG. 33.

Refer to FIG. 23 to FIG. 33. FIG. 23 is a schematic diagram of a structure of a first damping swing arm of a first damping mechanism according to another embodiment of this disclosure. FIG. 24 and FIG. 25 are schematic diagrams of a structure of a sliding member of a first damping mechanism according to other embodiments of this disclosure. FIG. 26 to FIG. 28 are cross-sectional top views of structures of a hinge apparatus in a folding state, an intermediate state, and an unfolding state according to other embodiments of this disclosure. FIG. 29 is an enlarged schematic diagram of a partial structure at a position of a first rolling body existing when a hinge apparatus is in an intermediate state according to another embodiment of this disclosure. FIG. 30 is a schematic diagram of force analysis of the first rolling body in FIG. 29 according to this disclosure. FIG. 31 and FIG. 33 are cross-sectional views of a partial structure at a position of a first rolling body existing when a hinge apparatus is in a folding state according to other embodiments of this disclosure. FIG. 32 and FIG. 34 are schematic diagrams of force analysis of the first rolling body in FIG. 31 and FIG. 33.

In this embodiment, structures of a first damping member 221, a first rolling body 26, and a first push-pressing apparatus are basically the same as structures in a first embodiment, and a difference lies in the following.

As shown in FIG. 23 to FIG. 25, and understood with reference to FIG. 6, a first concave portion 223, a protrusion 224, and a second concave portion 225 that are sequentially connected in a circumferential direction of the first damping member 221 are disposed on a first end face c of the first damping member 221. A contact portion 281 is disposed on a side that is of a sliding member 28 and that faces away from a push-pressing member 29. The contact portion 281 corresponds to the first concave portion 223, the protrusion 224, and the second concave portion 225 of the first damping member 221. The contact portion 281 has a push surface p inclined relative to an axis of a first connecting shaft 24. The first rolling body 26 abuts against the push surface p of the contact portion 281 in a rolling manner. The push surface p has a first end p1 and a second end p2. The push surface p extends from the first end p1 to the second end p2 in a direction that perpendicular to the axis of the first connecting shaft 24 and that faces away from the axis of the first connecting shaft 24, and extends in a direction that is along the axis of the first connecting shaft 24 and that faces an interior of the sliding member 28, so that an extension direction of the push surface p from the first end p1 to the second end p2 is inclined relative to the axis of the first connecting shaft 24.

In addition, a fixed base 21 has an abutting surface e disposed toward the first concave portion 223, the protrusion 224, and the second concave portion 225. The abutting surface e abuts, in the direction of the axis of the first connecting shaft 24, against a side that is of the first rolling body 26 and that faces away from the first end face c of the first damping member 221. In this way, the abutting surface e of the fixed base 21 and the push surface p of the contact portion 281 abut the first rolling body 26 against the first concave portion 223, the protrusion 224, and the second concave portion 225 of the first damping member 221.

The protrusion 224 has a guide surface j provided toward the first connecting shaft 24. The guide surface j has a first edge 2243 located on the first end face c of the first damping member 221, and a second edge 2244 facing away from the first end face c of the first damping member 221. A distance between the guide surface j and the first connecting shaft 24 increases in a direction from the first edge 2243 to the second edge 2244.

The first concave portion 223 of the first damping member 221 has a first bottom surface f perpendicular to the axis of the first connecting shaft 24 and a first transition surface h connected to the first bottom surface f and the guide surface j of the protrusion 224. The first transition surface h is inclined toward one end that is of the protrusion 224 and that faces away from the first damping member 221.

As shown in FIG. 23, FIG. 26, FIG. 31, and FIG. 33, and understood with reference to FIG. 6, when the first damping swing arm 22 is at a folding position, the first rolling body 26 abuts in the first concave portion 223 of the first damping member 221. In this case, the push-pressing member 29 applies an action force to the first rolling body 26 by using the sliding member 28. The first transition surface h of the first concave portion 223 is opposite to the abutting surface e of the fixed base 21, to clamp the first rolling body 26. This limits movement of the first rolling body 26 in the direction of the axis of the first connecting shaft 24. In this case, the first rolling body 26 forms, on the first transition surface h, a damping force that hinders rotation of the first damping member 221. In this way, the first damping member 221 is clamped with the sliding member 28 by using the first rolling body 26, and a damping force that limits rotation of the first damping member 221 relative to the first connecting shaft 24 is formed. Therefore, the first damping swing arm 22 is stably kept at the folding position.

As shown in FIG. 31 to FIG. 34, FIG. 31 is a schematic cross-sectional view of a partial structure in a direction parallel to an axis of a first connecting shaft 24. FIG. 33 is a schematic cross-sectional view of a partial structure in a direction perpendicular to an axis of a first connecting shaft 24. As shown in FIG. 31 and FIG. 32, when the first damping swing arm 22 rotates from a folding position to an intermediate position under an action of an external force, sufficient rotation torque is first applied to the first damping swing arm 22, so that the first rolling body 26 applies an action force $Fn_2$ to the first transition surface h. In this case, the push surface p of the sliding member 28 abuts against the first rolling body 26, and generates, on the first rolling body 26, a component force F1 parallel to the axis of the first connecting shaft 24. A magnitude of the component force F1 is equal to a push-pressing force of the push member 29 (that is, an elastic force of a spring). In addition, an inclination angle of the push surface p relative to the axis of the first connecting shaft 24 is $\theta_1$. Therefore, the push surface p generates, on the first rolling body 26, a component force F5 perpendicular to the axis of the first connecting shaft 24. A magnitude of F5 is $F1/\tan\theta_1$. In addition, the action force $Fn_2$ of the first rolling body 26 on the first transition surface h may be decomposed into a component force F2 parallel to the axis of the first connecting shaft 24 and a component force F4 perpendicular to the axis of the first connecting shaft 24. An inclination angle of the first transition surface h relative to the axis of the first connecting shaft 24 is $\theta_2$. Therefore, it may be obtained that $F4=F5=F1/\tan\theta_1$, and $F2=F4*\tan\theta_2$, that is, $F2=(F1/\tan\theta_1)*\tan\theta_2$.

As shown in FIG. 33 and FIG. 34, an inclination angle of the first transition surface h relative to a connection line between a circle center $O_1$ of the first rolling body 26 and an axis center $O_2$ of the first connecting shaft 24 is $\theta_5$. An included angle between the connection line $O_1O_2$ and a connection line $QO_2$ is $\theta_4$. $O_1$ is the circle center of the first rolling body 26, $O_2$ is the axis center of the first connecting shaft 24, and Q is a contact point of the first rolling body 26 on the first transition surface h. The action force $Fn_2$ of the first rolling body 26 on the first transition surface h may be further decomposed into a torsion force Fa that hinders rotation of the first damping swing arm 22 (in this case, a direction of the torsion force Fa is opposite to a rotation direction of the first damping swing arm 22). Therefore, it may be obtained that a magnitude of Fa is $F4*\cos(\theta_5+\theta_4)$, that is, $Fa=(F1/\tan\theta_1)*\cos(\theta_5+\theta_4)$. In addition, a rotation force arm of the torsion force Fa is a distance L2 between the contact point Q of the first rolling body 26 on the first transition surface h and the axis center $O_2$ of the first connecting shaft 24. Therefore, it may be obtained that when the first damping swing arm 22 rotates from the folding position to the intermediate position, rotation torque applied by the first rolling body 26 to the first transition surface h is $Fa*L2$. In an implementation, appropriate angles of $\theta_1$, $\theta_4$, and $\theta_5$ are set, so that Fa may be greater than F1.

In addition, under an action of an external force, the first rolling body 26 moves along the first transition surface h in a direction facing the first connecting shaft 24, and pushes the push surface p of the contact portion 281, so that the sliding member 28 moves synchronously in a direction facing the push-pressing member 29. In this way, the sliding member 28 squeezes the push-pressing member 29. This increases elastic deformation of the push-pressing member 29 and the push-pressing force of the push-pressing member 29. In addition, the first damping member 221 rotates relative to the sliding member 28, so that the first rolling body 26 in the contact portion 281 of the sliding member 28 rolls out from the first concave portion 223 and rolls to the guide surface j of the protrusion 224.

Therefore, in a process in which the first damping swing arm 22 rotates from the folding position to the intermediate position, when the first rolling body 26 abuts against the first transition surface h, the first rolling body 26 can form action forces F2, F4, and Fa (in an implementation, Fa is greater than F1) in three different directions on the first transition surface h. In this way, effect of an elastic force of the push-pressing member 29 (a magnitude of the elastic force of the push-pressing member 29 is F1) on the first damping member 221 is enhanced, a friction force applied to the first damping member 221 is increased, and damping effect in a rotation process of the first damping swing arm 22 is enhanced.

When the first damping swing arm 22 rotates from an intermediate position to a folding position, and the first rolling body 26 rolls from the protrusion 224 to the first transition surface h, rotation torque applied by the first rolling body 26 to the first transition surface h is $Fa*L2$ (in this case, a direction of a torsion force Fa is the same as a rotation direction of the first damping swing arm 22, and in an implementation, Fa is greater than F1). In this way, the first damping swing arm 22 can automatically rotate to the folding position, and is stably kept at the folding position. Therefore, effect of automatic folding is implemented.

Further, a joint between the first transition surface h and the first bottom surface of the first concave portion 223 and a joint between the first transition surface h and the guide surface j each are provided with an arc-shaped corner radius, and a corner between the first transition surface h and a tangent surface of a side edge of the guide surface j is provided at an obtuse angle. In this way, a process in which the first rolling body 26 rolls from the first concave portion 223 to the guide surface j is smoother, and a process in which the first damping swing arm 22 rotates from the folding position to the intermediate position is smoother. Therefore, a friction sense in a rotation process of the first damping swing arm 22 is reduced, and comfortableness of rotating the first damping swing arm 22 is improved.

The distance between the guide surface j and the first connecting shaft 24 increases in the direction from the first edge 2243 to the second edge 2244, so that the guide surface j is in an inclined state relative to the first connecting shaft 24. In addition, the guide surface j is provided into a circular arc in the circumferential direction of the first connecting shaft 24. In an implementation, a circle center of the circular arc is located on the axis of the first connecting shaft 24. The person skilled in the art may understand that, in another alternative implementation, the circle center of the circular arc may not be located on the axis of the first connecting shaft 24.

As shown in FIG. 23, FIG. 27, FIG. 29, and FIG. 30, and understood with reference to FIG. 6, when the first damping swing arm 22 is at an intermediate position, the first rolling body 26 abuts against the guide surface j, the guide surface j supports the first rolling body 26 in an inclined state relative to the first connecting shaft 24, and an inclination angle of the guide surface j is $\theta_3$. In this case, the sliding member 28 is subject to an elastic force F1 of the push-pressing member 29, so that the push surface p of the contact portion 281 of the sliding member 28 applies, to the first rolling body 26, a push-pressing force that is deflected away from the first connecting shaft 24. Therefore, an inclination angle $\theta_1$ of an axis of the push surface p relative to the first connecting shaft 24 may be obtained. In this way, the first rolling body 26 forms, under an action of the sliding member 28, a resultant force $Fn_2$ perpendicular to the guide surface j on the guide surface j. Effect of the resultant force $Fn_2$ on the guide surface j of the first damping member 221 may be decomposed into a component force F2 in a direction parallel to the axis of the first connecting shaft 24 and a component force F3 perpendicular to the axis of the first connecting shaft 24. The component force F2 enables an interaction force with a magnitude of F2 to be generated between a second end face d of the first damping member 221 and the fixed base 21, and the component force F3 enables an interaction force with a magnitude of F3 to be generated between an inner wall surface a of the first damping member 221 and an outer wall surface of the first connecting shaft 24. In addition, $F3=F1/\tan\theta_1$, and $F2=F3*\tan\theta_3$, that is, $F2=(F1/\tan\theta_1)*\tan\theta_3$. F1 is equal to a push-pressing force of the push-pressing member 29, and the resultant force $Fn_2$ is equal to $F2/\sin\theta_3$. In an implementation, appropriate angles of $\theta_1$ and $\theta_3$ are set, so that F2 may be greater than F1. Further, the resultant force $Fn_2$ is also greater than F1.

Therefore, compared with another technology, in this solution, the resultant force $Fn_2$ of the first rolling body 26 on the first damping member 221 is greater than the push-pressing force F1 of the push-pressing member 29, and the component force F2 that is generated by the first rolling body 26 on the first damping member 221 and that is parallel to a direction of the first connecting shaft 24 is greater than the push-pressing force F1 of the push-pressing member 29. In this way, an action force generated by the push-pressing force F1 of the push-pressing member 29 on the first damping member 221 is amplified, and a damping force in a rotation process of the first damping member 221 is increased. Therefore, the first damping swing arm 22 can stably hover toward any position between a folding position and an unfolding position at the folding position or the unfolding position, damping feedback obtained when a user rotates the first damping swing arm 22 is improved, and comfortableness obtained when the user rotates the first damping swing arm 22 is enhanced.

As shown in FIG. 23 and FIG. 29, and understood with reference to FIG. 6, the second concave portion 225 of the first damping member 221 has a second bottom surface perpendicular to the axis of the first connecting shaft 24 and a second transition surface m connected to the second bottom surface and the guide surface j of the protrusion 224. The second transition surface m is inclined toward the end that is of the protrusion 224 and that faces away from the first damping member 221.

When the first damping swing arm 22 rotates from an intermediate position to an unfolding position under an action of an external force, the first rolling body 26 rolls into the second transition surface m from the guide surface j. In this case, the first rolling body 26 loses support of the guide surface j, so that the first rolling body 26 rolls along the second transition surface m to the second concave portion 225. The sliding member 28 moves toward the first end face c of the first damping member 221 under an action of the push-pressing member 29. In addition, the first rolling body 26 rolls, under an action of pushing and pressing of the sliding member 28, in a direction facing away from the first connecting shaft 24. In this case, the first rolling body 26 is subject to a support force of the second transition surface m. The first rolling body 26 applies, to the second transition surface m, a torsion force Fa' (in this case, a direction of the torsion force Fa' is the same as a rotation direction of the first damping swing arm 22) that drives the first damping member 221 to rotate toward the unfolding position. For a magnitude of the torsion force Fa' and magnitudes of component forces in different directions, refer to the foregoing analysis of Fa. When the first transition surface h and the second transition surface m are symmetrically provided, Fa and Fa' have the same magnitude. In this way, the first damping swing arm 22 can automatically roll into the second concave portion 225 under an action of pushing of the first rolling body 26, so that the first damping swing arm 22 is automatically unfolded when approaching the unfolding position, with no need to apply an external force.

When the first damping swing arm 22 rotates from an unfolding position to an intermediate position, a torsion force Fa' (in this case, a direction of the torsion force Fa' is opposite to a rotation direction of the first damping swing arm 22) applied by the first rolling body 26 to the second transition surface m performs a function of hindering rotation of the first damping swing arm 22. In addition, the first rolling body 26 further applies, to the second transition surface m, a component force F2' parallel to the axis of the first connecting shaft 24 and a component force F4' perpendicular to the axis of the first connecting shaft 24. This increases a friction force applied to the first damping member 221. In this way, a damping force generated when the first damping swing arm 22 rotates from the unfolding position to the intermediate position is increased. Comfortableness obtained when the first damping swing arm 22 rotates can be improved. In addition, the first damping swing arm 22 can be stably kept at the unfolding position.

Further, a joint between the second transition surface m and the second bottom surface of the second concave portion 225 and a joint between the second transition surface m and the guide surface j are provided with an arc-shaped corner radius, and a corner between the second transition surface m and a tangent surface of a side edge of the guide surface j is provided at an obtuse angle. In this way, a process in which the first rolling body 26 rolls from the guide surface j to the second concave portion 225 is smoother, and a process in which the first damping swing arm 22 rotates from the intermediate position to the unfolding position is smoother. Therefore, a friction sense in a rotation process of the first damping swing arm 22 is reduced, and the comfortableness of rotating the first damping swing arm 22 is improved.

As shown in FIG. 23 and FIG. 28, and understood with reference to FIG. 6, when the first damping swing arm 22 is at an unfolding position, the first rolling body 26 abuts in the second concave portion 225 of the first damping member 221. In this case, the second transition surface m of the second concave portion 225 is opposite to the abutting surface e of the fixed base 21, to clamp the first rolling body 26. This limits movement of the first rolling body 26 in the direction of the axis of the first connecting shaft 24. In addition, the second transition surface m forms, on the first damping member 221 by using the first rolling body 26, a torsion force Fa' that hinders rotation of the first damping member 221 (in this case, a direction of the torsion force Fa' is opposite to a rotation direction of the first damping swing arm 22). In this way, the first damping member 221 is clamped with the sliding member 28 by using the first rolling body 26, and a damping force that limits rotation of the first damping member 221 relative to the first connecting shaft 24 is formed. Therefore, the first damping swing arm 22 is stably kept at the unfolding position.

The person skilled in the art may understand that, when the first damping swing arm 22 rotates from an unfolding position to a folding position, a first rotating arm 41 can also hover at any intermediate position. When the first damping swing arm 22 rotates from an intermediate position to a folding position or an unfolding position under an action of an external force, the first damping swing arm 22 can also be automatically folded or unfolded when the first damping swing arm 22 approaches the folding position or the unfolding position, with no need to apply an external force.

It is clear that the person skilled in the art can make various modifications and variations to this disclosure without departing from the spirit and scope of this disclosure. This disclosure is intended to cover these modifications and variations of this disclosure, provided that they fall within the scope defined by the claims of this disclosure and their equivalent technologies.

What is claimed is:

1. A damping mechanism, comprising:

a fixed base;

a damping swing arm comprising a first end;

a damping member disposed at the first end rotatably connected to the fixed base, configured to permit the damping swing arm to rotate between a folded position and an unfolded position around an axis relative to the fixed base, and wherein the damping member comprises:

a circumferential outer wall surface;

a first concave portion disposed on the circumferential outer wall surface;

a second concave portion disposed on the circumferential outer wall surface;

a protrusion positioned between the first concave portion and the second concave portion, wherein the protrusion comprises a guide surface inclined relative to the axis; and a rolling body configured to:

abut the first concave portion when the damping swing arm is at the folded position;

abut the second concave portion when the damping swing arm is at the unfolded position; and roll onto and abut the guide surface; and a push-pressing apparatus abutting against the rolling body and configured to:

apply an abut-pressing force to the damping member through the rolling body in response to the rolling body abutting against the first concave portion, the protrusion, and the second concave portion to move with the rolling body to squeeze the push-pressing apparatus in a direction along the axis when the damping swing arm rotates to a position between the folded position and the unfolded position.

2. The damping mechanism of claim 1, wherein the push-pressing apparatus comprises:

a sliding member located at a second end of the damping member and configured to slide along the axis relative to the fixed base;

a contact portion disposed on the sliding member, wherein the contact portion comprises a push surface configured to abut the rolling body; and a push-pressing member disposed on a side of the sliding member that faces away from the second end and configured to apply a push-pressing force to the sliding member, wherein the rolling body is further configured to roll onto the guide surface of the protrusion from the first concave portion and the second concave portion, and wherein the sliding member is configured to move with the rolling body in the direction away from the damping member relative to the fixed base to press the push-pressing member in the direction away from the damping member when the damping swing arm rotates to the position between the folded position and the unfolded position.

3. The damping mechanism of claim 2, wherein the contact portion is located on sides of the first concave portion, the protrusion, and the second concave portion that face away from the axis, wherein the fixed base comprises an abutting surface disposed toward the first concave portion, the protrusion, and the second concave portion, wherein the abutting surface abuts against a side of the rolling body or the contact portion that faces away from the axis, and wherein the rolling body abuts against an outer wall surface of a side wall of the damping member in a direction facing the axis.

4. The damping mechanism of claim 3, wherein the protrusion comprises a wedge-shaped curved-surface structure, wherein the protrusion has a first end portion proximate to the second end and a second end portion distal from the second end, and wherein a thickness of the protrusion increases from the first end portion to the second end portion.

5. The damping mechanism of claim 4, wherein the guide surface comprises an arc in a circumferential direction of the damping member.

6. The damping mechanism of claim 4, wherein the protrusion has a first transition surface and a second transition surface that are located on two sides of the guide surface and that are connected to the guide surface, wherein the first transition surface is further connected to a first bottom surface of the first concave portion, wherein the second transition surface is further connected to a second bottom surface of the second concave portion, wherein the first transition surface and the second transition surface are inclined toward the first end portion of the protrusion, and wherein the rolling body is configured to move along the first transition surface or the second transition surface in a direction facing the first end portion of the protrusion and to roll onto the guide surface and push the push surface of the contact portion so that the sliding member is moveable relative to the fixed base along the axis.

7. The damping mechanism of claim 6, wherein the first transition surface and the first concave portion each comprise an arc-shaped radiused edge, wherein a first side edge of the guide surface is adjacent to the first transition surface at an obtuse angle, wherein the second transition surface and the second concave portion each comprise an arc-shaped radiused edge, and wherein a second side edge of the guide surface is adjacent to the second transition surface at an obtuse angle.

8. The damping mechanism of claim 2, wherein the first concave portion, the protrusion, and the second concave portion are disposed on an end face of a side wall of the damping member, and wherein a surface of the protrusion that faces the axis comprises the guide surface, wherein the contact portion of the sliding member is located on a side of the first concave portion, the protrusion, and the second concave portion and faces away from the end face of the damping member, abuts against a side of the rolling body and faces away from the guide surface, and wherein the push surface is inclined relative to the axis, wherein the fixed base comprises an abutting surface disposed toward the first concave portion, the protrusion, and the second concave portion, and wherein the abutting surface abuts, along the axis, against a side of the rolling body that faces away from the end face of the damping member, and wherein the damping swing arm is configured to rotate to the position between the folded position and the unfolded position to cause the rolling body to push the push surface of the contact portion in a direction facing the axis, and to cause the sliding member to slide in the direction away from the damping member relative to the fixed base.

9. The damping mechanism of claim 8, wherein the push surface comprises a first end and a second end, and wherein the push surface extends from the first end to the second end perpendicular to the axis, and extends along the axis and facing an interior of the sliding member, and wherein an extension direction of the push surface from the first end to the second end is inclined relative to the axis.

10. The damping mechanism of claim 8, wherein the guide surface of the protrusion comprises a first edge located on the end face of the damping member and a second edge facing away from the end face of the damping member, and wherein a distance between the guide surface and the axis increases in a direction from the first edge to the second edge.

11. The damping mechanism of claim 10, wherein the guide surface comprises an arc in a circumferential direction of the damping member.

12. The damping mechanism of claim 10, wherein the protrusion comprises a first transition surface and a second transition surface that are located on two sides of the guide surface and that are connected to the guide surface, wherein the first transition surface is further connected to a bottom surface of the first concave portion, and wherein the second transition surface is further connected to a bottom surface of the second concave portion, and wherein the damping swing arm is configured to rotate to the position between the folded position and the unfolded position, and configured to roll the rolling body onto the guide surface along the first transition surface and the second transition surface and to roll to the first transition surface and the second transition surface of the protrusion and the abutting surface of the fixed base opposite to each other to press against the rolling body, wherein the rolling body is configured to move perpendicular and adjacent to the axis to the push surface of the contact portion, wherein the sliding member is moveable relative to the fixed base along the axis and facing the push-pressing member.

13. The damping mechanism of claim 12, wherein the first transition surface and the first concave portion each comprise an arc-shaped radiused edge, wherein a first side edge of the guide surface comprises an arc-shaped radiused edge and is adjacent to the first transition surface at an obtuse angle, wherein the second transition surface and the second concave portion each comprise an arc-shaped radiused edge, and wherein a second side edge of the guide surface is adjacent to the second transition surface at an obtuse angle.

14. The damping mechanism of claim 2, further comprising a connecting shaft disposed on the fixed base, wherein the damping member further comprises a sleeve structure on the connecting shaft, wherein the damping member is rotatably connected to the connecting shaft, wherein the damping swing arm is free to rotate around the connecting shaft relative to the fixed base, and wherein the axis is an axis of the connecting shaft.

15. The damping mechanism of claim 14, wherein the sliding member is slidably connected to the connecting shaft and is slidable along the axis of the connecting shaft, and wherein a side of the sliding member that faces the push-pressing member is planar.

16. The damping mechanism of claim 14, wherein the push-pressing member comprises an elastic member sleeved on the connecting shaft and elastically deformed along the axis of the connecting shaft in a configuration to apply push-pressing force to the sliding member.

17. The damping mechanism of claim 1, wherein two symmetrically disposed damping members are disposed at the end of the damping swing arm, and wherein the rolling body and the push-pressing apparatus are disposed in correspondence with the two damping members at each of two ends of the end of the damping swing arm that are along the axis.

18. A hinge apparatus, comprising:
a damping mechanism comprising:
  a fixed base;
  a damping swing arm comprising a first end;
  at least one damping member disposed at the first end rotatably connected to the fixed base, configured to permit the damping swing arm to rotate between a folded position and an unfolded position around an axis relative to the fixed base and comprising:
    a circumferential outer wall surface;
    a first concave portion disposed on the circumferential outer wall surface;
    a second concave portion disposed on the circumferential outer wall surface;
    a protrusion positioned between the first concave portion and the second concave portion, wherein the protrusion comprises a guide surface inclined relative to the axis; and
  a rolling body configured to:
    abut the first concave portion when the damping swing arm is at the folded position;
    abut the second concave portion when the damping swing arm is at the unfolded position; and
    roll onto and abut the guide surface; and
  a push-pressing apparatus, wherein the push-pressing apparatus abuts against the rolling body and configured to apply an abut-pressing force to the damping member through the rolling body in response to the rolling body abutting against the first concave portion, the protrusion, and the second concave portion to move with the rolling body to squeeze the push-pressing apparatus in a direction along the axis when the damping swing arm rotates to a position between the folded position and the unfolded position.

19. The hinge apparatus of claim 18, wherein the hinge apparatus comprises two symmetrically disposed damping mechanisms.

20. A foldable electronic device, comprising:
a first body;
a second body; and
a hinge apparatus configured to drive the first body and the second body to be unfolded or folded relative to each other, wherein the hinge apparatus comprises a damping mechanism, and wherein the damping mechanism comprises:
  a fixed base;
  a damping swing arm comprising a first end;
  a damping member disposed at the first end rotatably connected to the fixed base, configured to permit the damping swing arm to rotate between a folded position and an unfolded position around an axis relative to the fixed base and comprising:
    a circumferential outer wall surface;
    a first concave portion disposed on the circumferential outer wall surface;
    a second concave portion disposed on the circumferential outer wall surface;
    a protrusion positioned between the first concave portion and the second concave portion, wherein the protrusion comprises a guide surface inclined relative to the axis; and
  a rolling body configured to:
    abut the first concave portion when the damping swing arm is at the folded position;
    abut the second concave portion when the damping swing arm is at the unfolded position; and
    roll onto and abut the guide surface; and a push-pressing apparatus, wherein the push-pressing apparatus abuts against the rolling body and configured to apply an abut-pressing force to the damping member through the rolling body in response to the rolling body abutting against the first concave portion, the protrusion, or the second concave portion to move with the rolling body to squeeze the push-pressing apparatus in a direction along the axis when the damping swing arm rotates to a position between the folded position and the unfolded position.

\* \* \* \* \*